US012462899B2

(12) United States Patent
Tonekaboni et al.

(10) Patent No.: US 12,462,899 B2
(45) Date of Patent: Nov. 4, 2025

(54) UTILIZING COMPOUND-PROTEIN MACHINE LEARNING REPRESENTATIONS TO GENERATE BIOACTIVITY PREDICTIONS

(71) Applicant: Recursion Pharmaceuticals, Inc., Salt Lake City, UT (US)

(72) Inventors: Seyed Ali Madani Tonekaboni, Toronto (CA); Daniella Fiora Lato, Toronto (CA); Stephen Scott MacKinnon, Burlington (CA)

(73) Assignee: Recursion Pharmaceuticals, Inc., Salt Lake City, UT (US)

( * ) Notice: Subject to any disclaimer, the term of this patent is extended or adjusted under 35 U.S.C. 154(b) by 0 days.

(21) Appl. No.: 18/505,754

(22) Filed: Nov. 9, 2023

(65) Prior Publication Data

US 2025/0157585 A1  May 15, 2025

(51) Int. Cl.
 *G16B 40/20* (2019.01)
(52) U.S. Cl.
 CPC .................................... *G16B 40/20* (2019.02)
(58) Field of Classification Search
 CPC ...................................................... G16B 40/20
 See application file for complete search history.

(56) References Cited

U.S. PATENT DOCUMENTS

2005/0053999 A1* 3/2005 Gough ..................... C40B 30/04
435/6.16
2019/0130290 A1 5/2019 Kerber et al.
(Continued)

FOREIGN PATENT DOCUMENTS

WO      2020/140156 A1      7/2020
WO  WO-2022226327 A1 *  10/2022

OTHER PUBLICATIONS

Karimi, Mostafa, et al. "DeepAffinity: interpretable deep learning of compound-protein affinity through unified recurrent and convolutional neural networks." Bioinformatics 35.18 (2019): 3329-3338. (Year: 2019).*

(Continued)

*Primary Examiner* — Miranda M Huang
*Assistant Examiner* — Sidney Vincent Bostwick
(74) *Attorney, Agent, or Firm* — Keller Preece PLLC

(57) ABSTRACT

The present disclosure relates to systems, non-transitory computer-readable media, and methods that utilizing compound-protein machine learning representations to generate target results. For example, the disclosed systems can utilize a compound-protein interaction machine learning model to generate a compound-protein machine learning representation for compound protein pairs. The disclosed systems can utilize the compound-protein machine learning representation to train and utilize other target machine learning models in generating predicted bioactivity results. For example, the disclosed systems train a target machine learning model from compound-protein machine learning representations to generate ADMET predictions and/or biological perturbation program predictions. Furthermore, the disclosed systems can utilize one or more explainability models in conjunction with target machine learning models trained based on compound-protein machine learning representations to identify proteins that contribute to predicted bioactivity results.

20 Claims, 25 Drawing Sheets

(56) References Cited

U.S. PATENT DOCUMENTS

| | | | |
|---|---|---|---|
| 2022/0076787 A1* | 3/2022 | Ellington | C07K 14/43595 |
| 2022/0108766 A1 | 4/2022 | Mackinnon et al. | |
| 2022/0230710 A1* | 7/2022 | Amimeur | G16B 35/10 |
| 2023/0063188 A1* | 3/2023 | Choi | G16C 20/70 |

OTHER PUBLICATIONS

Atas Guvenilir, Heval, and Tunca Doğan. "How to approach machine learning-based prediction of drug/compound-target interactions." Journal of Cheminformatics 15.1 (2023): 1-36. (Year: 2023).*

Li, Shuya, et al. "MONN: a multi-objective neural network for predicting compound-protein interactions and affinities." Cell Systems 10.4 (2020): 308-322. (Year: 2020).*

Wang, Xun, et al. "SSGraphCPI: A novel model for predicting compound-protein interactions based on deep learning." International Journal of Molecular Sciences 23.7 (2022): 3780. (Year: 2022).*

Mayr, Andreas, et al. "Deep Tox: toxicity prediction using deep learning." Frontiers in Environmental Science 3 (2016): 80. (Year: 2016).*

Wang, Erniu, et al. "A graph convolutional network-based method for chemical-protein interaction extraction: algorithm development." JMIR Medical Informatics 8.5 (2020): e17643. (Year: 2020).*

Hodos et al. Computational approaches to drug repurposing and pharmacology. Willey Interdiscip Rev Syst Biol Med, vol. 8, 46 pages. (Year:2017).

Lagorce, David, et al. "Computational analysis of calculated physicochemical and ADM ET properties of protein-protein interaction inhibitors." Scientific reports 7.1 (2017): 46277.

U.S. Appl. No. 18/505,728, Aug. 29, 2024, Office Action.

U.S. Appl. No. 18/505,748, Sep. 23, 2024, Office Action.

U.S. Appl. No. 18/505,728, May 29, 2025, Office Action.

U.S. Appl. No. 18/505,748, Mar. 19, 2025, Office Action.

U.S. Appl. No. 18/505,728, Feb. 18, 2025, Office Action.

U.S. Appl. No. 18/505,748, Dec. 20, 2024, Office Action.

Hodgson, E., Mailman, R. B., & Chambers, J. E. (Eds.). (1999). Inhibitory concentration (IC). In Macmillan Dictionary of Toxicology (2nd ed.). Macmillan Publishers Ltd. https://search.credoreference.com/articles/Qm9va0FydGljbGU6MTQ1Nzk4MA==? aid=279753</div> (Year: 1999).

U.S. Appl. No. 18/505,728, dated Aug. 26, 2025, Notice of Allowance.

U.S. Appl. No. 18/505/748, dated Aug. 20, 2025, Office Action.

* cited by examiner

Blood Brain Barrier

| Featurization method | Median ROC-AUC | Median PR-AUC |
|---|---|---|
| Mm_HighConf | 0.93 | 0.979 |
| mm_input_features | 0.921 | 0.983 |
| pattern | 0.907 | 0.976 |
| atom_pair | 0.9 | 0.982 |
| layered | 0.9 | 0.989 |
| morgan2_feat | 0.884 | 0.98 |
| daylight2048 | 0.88 | 0.97 |

Comparison with classical Fingerprints

| Program | Best ROC-AUC (chemoproteomic strategy) | PR-AUC (chemoproteomic strategy) | Best Chem FP | Best ROC-AUC (Chem FP) | PR-AUC (Chem FP) |
|---|---|---|---|---|---|
| GENE 1 | 0.94 | 0.63 | layered | 0.73 | 0.37 |
| GENE 2 | 0.74 | 0.48 | layered | 0.75 | 0.54 |
| GENE 3 | 0.7 | 0.90 | atom pair | 0.62 | 0.87 |
| GENE 4 | 0.69 | 0.4 | layered | 0.59 | 0.21 |
| GENE 5 | 0.67 | 0.7 | layered | 0.56 | 0.66 |
| GENE 6 | 0.66 | 0.36 | pattern | 0.55 | 0.18 |
| GENE 7 | 0.63 | 0.8 | atom pair | 0.61 | 0.76 |

*Fig. 18*

UTILIZING COMPOUND-PROTEIN MACHINE LEARNING REPRESENTATIONS TO GENERATE BIOACTIVITY PREDICTIONS

BACKGROUND

Recent years have seen significant developments in hardware and software platforms for training and utilizing machine learning models for generating predictions. For example, conventional systems utilize large volumes of training data to teach machine learning models to generate intelligent predictions corresponding to complex biological interactions between genes, compounds, and/or proteins. Despite these recent advances, conventional systems suffer from a number of technical deficiencies, particularly with regard to accuracy, efficiency, and operational inflexibility in implementing machine learning technologies.

SUMMARY

Embodiments of the present disclosure provide benefits and/or solve one or more of the foregoing or other problems in the art with systems, non-transitory computer-readable media, and methods for utilizing compound-protein machine learning representations to generate bioactivity predictions. For example, the disclosed systems can utilize a compound-protein interaction machine learning model (e.g., a chemoproteomic model trained to predict binding matches between compounds and proteins) to generate a compound-protein machine learning representation for compound-protein pairs. This machine learning representation provides a unique proteome fingerprint indicating compound interactions within a compound-protein space. The disclosed systems can utilize the compound-protein machine learning representation to train and utilize other target machine learning models in generating predicted target bioactivity results for compounds. For example, the disclosed systems train a target machine learning model from compound-protein machine learning representations to generate ADMET predictions (e.g., molecular property predictions such as blood brain barrier properties) for query compounds. Similarly, the disclosed systems can train a target machine learning model from compound-protein machine learning representations to generate biological perturbation program predictions for a plurality of query compounds relative to a target biological activity (e.g., for anticipating success or failure of compounds demonstrating a target biological activity within a biological perturbation program).

Furthermore, the disclosed systems can utilize one or more explainability models in conjunction with target machine learning models trained based on compound-protein machine learning representations. For example, the disclosed systems can utilize a machine learning explainability model to identify proteins that contribute to predicted bioactivity results generated from the trained target machine learning models. In this manner, the disclosed systems not only generate improved machine learning predictions but can also identify and surface the particular proteins correlated to the underlying biological mechanisms driving the target results for particular compounds. To illustrate, the disclosed systems can generate an ADMET prediction for a compound and identify the particular proteins contributing to the ADMET prediction and potentially driving the underlying biological processes. Similarly, in one or more implementations, the disclosed systems can generate impact predictions (e.g., biological perturbation program predictions) for a plurality of query compounds relative to a target biological activity and identify the proteins contributing to the predicted success or failure of the particular compounds. Indeed, in one or more implementations, the disclosed systems generate a heatmap illustrating marginal contributions of proteins relative to impact predictions of compounds for a particular program exploring a target gene.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

FIG. 18 illustrates experimental performance results of target machine learning models generating impact predictions for different biological perturbation programs in accordance with one or more embodiments.

DETAILED DESCRIPTION

Figure 1:
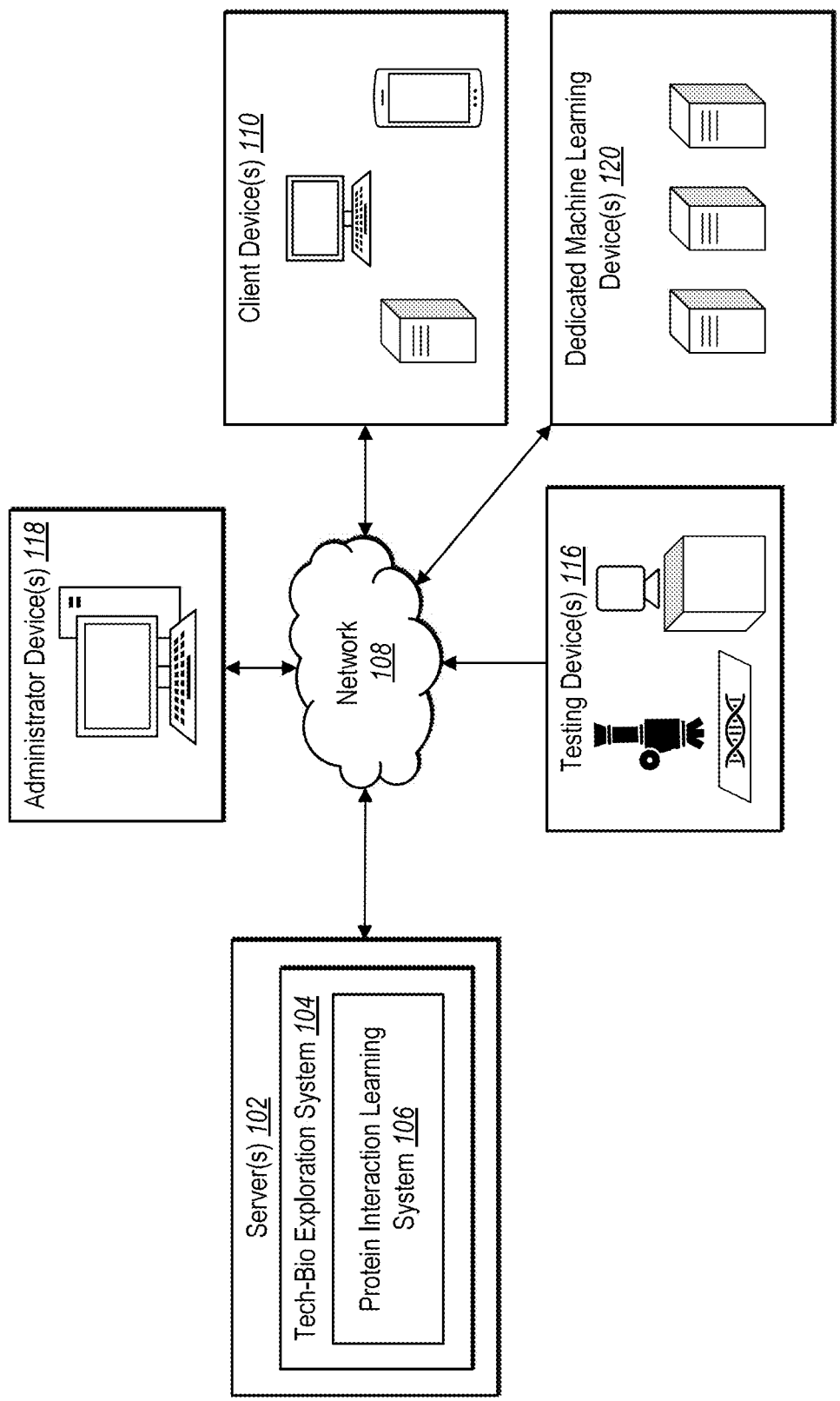
FIG. 1 illustrates a schematic diagram of a system environment in which a protein interaction learning system can operate in accordance with one or more embodiments.

This disclosure describes one or more embodiments of a protein interaction learning system that utilizes a compound-protein machine learning representations to generate bioactivity predictions. For example, the protein interaction learning system utilizes a compound-protein interaction machine learning model to generate match scores between compounds and proteins (e.g., protein-pockets) and build a compound-protein machine learning representation. By building a compound-protein machine learning representation, the protein interaction learning system can generate a unique proteome matching fingerprint indicating interactions within a compound-protein space for additional machine learning tasks. To illustrate, the protein interaction learning system utilizes the compound-protein machine learning representation to train one or more additional target machine learning models to generate ADMET predictions or impact predictions for a biological activity of a biological perturbation program. In addition, the protein interaction learning system can utilize machine learning explainability models in conjunction with target machine learning models trained on compound-protein machine learning representations to determine marginal contributions of proteins in generating predicted bioactivity results.

As just mentioned, in one or more implementations, the protein interaction learning system utilizes a compound-protein interaction machine learning model to generate a compound-protein machine learning representation. Specifically, in one or more embodiments, the protein interaction learning system utilizes a classification machine learning model to analyze pairs of compounds and proteins. The classification machine learning model generates a match score between a compound and protein indicating a binding likelihood. The protein interaction learning system combines these match scores to generate a compound-protein machine learning representation. For example, for a particular compound, the protein interaction learning system can generate different match scores for a variety of different proteins and combine these match scores into a machine learning representation of compound interaction likelihoods within the protein space.

In one or more embodiments, the protein interaction learning system utilizes this machine learning representation as a digital signal for generating improved predictions for other machine learning tasks (e.g., to predict bioactivity results). For example, in one or more implementations, the protein interaction learning system utilizes the compound-protein machine learning representation to generate molecular property predictions, such as carcinogenic potency, passing the blood brain barrier, human oral bioavailability, human intestinal absorption, and/or other ADMET predictions. Specifically, the protein interaction learning system trains a target machine learning model to analyze the compound-protein machine learning representation and generate a prediction regarding the molecular property. The protein interaction learning system then trains the target machine learning model by comparing the prediction with a ground truth (e.g., a measured ADMET result). Once trained the target machine learning model can generate ADMET predictions for new compounds based on a compound-protein machine learning representation for that compound.

Similarly, as mentioned above, the protein interaction learning system can also utilize the compound-protein machine learning representation to generate other predicted target bioactivity results. For instance, the protein interaction learning system can train and utilize a target machine learning to generate impact predictions for biological perturbation programs corresponding to target biology activities. To illustrate, the protein interaction learning system can train a target machine learning model to analyze compound-protein machine learning representations for compounds and generate an impact prediction for the compounds relative to a target gene, target compound, or target disease (e.g., to mimic a particular gene knockout perturbation, to mimic a particular compound perturbation, or to identify a compound that has an impact on a particular disease). In this manner, the protein interaction learning system can identify those compounds most likely to emerge as successful hits within a biological perturbation program for a particular target gene.

In training target machine learning models utilizing compound-protein machine learning representations, in one or more implementations, the protein interaction learning system utilizes various techniques to generate more accurate machine learning predictions. For example, in some implementations, the protein interaction learning system performs features selection and normalization techniques in generating compound-protein machine learning representations. To illustrate, the protein interaction learning system generate protein confidence scores for the compound-protein interaction machine learning model relative to particular proteins. In particular, the protein interaction learning system can utilizes a separately trained machine learning model to analyze the compound-protein interaction machine learning model and identify protein confidence scores indicating the accuracy or confidence of the compound-protein interaction machine learning model in generating predictions (e.g., match scores) for a particular protein. The protein interaction learning system can then utilize the confidence scores to select features to utilize in generating the compound-protein machine learning representations. Furthermore, the protein interaction learning system utilizes normalization techniques to normalize across features to generate comparable compound-protein machine learning representations.

In training, the protein interaction learning system also utilizes unique cross-validation techniques to train and validate target machine learning models. Indeed, because certain compounds are geometrically similar to other compounds, the protein interaction learning system utilizes a clustering algorithm to divide training data sets and avoid significant overlap in training and testing data sets. For example, in some implementations, the protein interaction learning system applies a clustering algorithm to molecules to generate compound clusters. The protein interaction learning system then divides a training data set based on these clusters (e.g., assigns 3 clusters to training and 2 clusters to testing).

In one or more implementations, the protein interaction learning system also trains target machine learning models by applying a filter based on a measure of similarity. The protein interaction system can determine this measure of similarity and filter based on a variety of different biological data signals, including phenomic data (e.g., digital images of cell phenotypes for different perturbations), transcriptomic data (e.g., digital signals regarding similarity across mRNA), metabolomic data (e.g., digital signals regarding similarity in metabolic processes, activity, or results), or proteomic data (e.g., digital signals regarding similarity in proteins). For example, in generating an impact prediction for a biological perturbation program of a target gene, the protein interaction learning system can filter datapoints (e.g., compound or gene datapoints) based on a measure of similarity between the target gene and the datapoints. Specifically, the protein interaction learning system can generate experimental data from perturbation experiments involving the target gene and the compounds. Experimental data may include one or more types of observations, such as phenomic digital images, gene sequencing, mass spectroscopy, or other measurements describing the active state of the well when perturbed (e.g., by compounds). The protein interaction learning system can generate machine learning embeddings from these phenomic digital images and compare these machine learning embeddings to determine a measure of similarity (e.g., cosine similarity or Euclidian distance within the embedding feature space). The protein interaction learning system can apply a similarity threshold based on the measure of similarity to filter datapoints in training to improve the accuracy of the trained models.

As mentioned briefly above, conventional systems suffer from a number of technical deficiencies with regard to implementing computing devices. For example, conventional systems often generate inaccurate machine learning predictions. Indeed, although conventional systems can utilize machine learning models to generate some biological predictions, such predictions are often inaccurate because conventional systems consider conventional signals, such as compound structures or digital assay results. These signals often fail to model in-depth underlying information with regard to compound interactions and pertinent biological drivers.

Conventional systems are also operationally inflexible. Indeed, conventional systems often cannot provide predictions with regard to different target features. For example, conventional systems may be able to predict a potential relationship between a gene or disease, however, conventional systems are often unable to model other molecular properties. This, conventional systems are unable to flexibly expand machine learning techniques into different target tasks. Conventional systems are also inflexible with regard to identifying contributors to underlying predictions. Indeed, conventional systems may be able to rigidly generate certain predictions but fail to provide pertinent dynamic information regarding the drivers for those predictions.

Furthermore, conventional systems are often inefficient. Indeed, conventional systems require significant computing resources to generate/train applicable machine learning models. Indeed, convergence of machine learning models in complex biological feature spaces can require significant training data volumes and exorbitant computer resources in processing training data and modifying model parameters. Furthermore, because of the inaccuracies and inefficiencies discussed above, conventional systems require significant user interfaces and user interactions to determine relationships and biological interactions. Indeed, conventional systems multiply computer implemented processes in testing (e.g., running automated robotic assays), analysis (e.g., implementing additional machine learning models), and identification (e.g., compound selection processes) within a compound discovery pipeline.

As suggested by the foregoing discussion, the protein interaction learning system provides a variety of technical advantages relative to conventional systems. For example, the protein interaction learning system can improve accuracy of machine learning models and implementing computing devices. By utilizing a compound-protein interaction machine learning model to generate a compound-protein machine learning representation, the protein interaction learning system can more accurately model underlying interactions within the protein feature space. This signal thus improves accuracy and performance in training target machine learning models in generating predicted target results.

In addition, as mentioned above, the protein interaction learning system can improve prediction accuracy of implementing computing devices in a variety of other ways. For example, the protein interaction learning system can utilize an additional machine learning model to generate protein confidence scores for the compound-protein interaction machine learning model across different proteins. The protein interaction learning system can then filter features based on the protein confidence scores to improve the underlying features and performance (both accuracy and training efficiency) of target machine learning models. Similarly, the protein interaction learning system can utilize measures of similarity between phenomic digital images to further filter out datapoints in training to improve accuracy of the resulting models. Furthermore, the protein interaction learning system can further improve performance by utilizing compound clustering in cross-validation so that target machine learning models are trained and tested across diverse compound shapes/types.

In one or more implementations, the protein interaction learning system also improves operational flexibility relative to conventional systems. Indeed, the protein interaction learning system can utilize compound-protein machine learning representations to train a variety of target machine learning models to generate a variety of different target bioactivity results. As mentioned above, the protein interaction learning system can generate a variety of different molecular property predictions (i.e., ADMET predictions) and/or impact predictions for compounds within different biological perturbation programs for target genes. By generating a compound-protein machine learning representation that represents compound interactions within the protein feature space, the protein interaction learning system can accurately generate a variety of predictions because target machine learning models consider the underlying interactions between compounds and proteins.

The protein interaction learning system also improves operational flexibility by utilizing an explainability model to generate and provide information regarding contributions to predicted results. For example, the protein interaction learning system can not only generate flexible predictions for a variety of molecular properties, but the protein interaction learning system can utilize a machine learning explainability model to analyze the target machine learning model and generate proteins contributing to the predicted target result. Thus, the protein interaction learning system can dynamically identify contributing factors driving underlying biology for molecular property predictions. Similarly, in generating impact predictions for biological perturbation programs, the protein interaction learning system can flexibly identify compounds and proteins contributing to particular biological activities.

The protein interaction learning system also improves efficiency of implementing systems. By utilizing a compound-protein machine learning representation, the protein interaction learning system can improve reliable convergence and reduce the need for other data in training target machine learning models. Furthermore, the protein interaction learning system can significantly reduce the user interfaces and user interactions needed to determine relationships and biological interactions. Indeed, as explained in greater detail below, the protein interaction learning system can generate improved user interfaces that not only provide predictions, but graphical elements of proteins and/or compounds contribution to particular outcomes. This can significantly reduce user interactions and user interfaces needed to tease out inter-relationships. The protein interaction learning system can also reduce computer-implemented testing, analysis, and selection processes within a compound discovery pipeline.

Additional detail regarding a protein interaction learning system 106 will now be provided with reference to the figures. In particular, FIG. 1 illustrates a schematic diagram of a system environment in which the protein interaction learning system 106 can operate in accordance with one or more embodiments.

As shown in FIG. 1, the environment includes server(s) 102 (which includes a tech-bio exploration system 104 and the protein interaction learning system 106), a network 108, client device(s) 110, testing device(s) 116, and administrator device(s) 118, and dedicated machine learning device(s) 120. As further illustrated in FIG. 1, the various computing devices within the environment can communicate via the network 108. Although FIG. 1 illustrates the protein interaction learning system 106 being implemented by a particular component and/or device within the environment, the protein interaction learning system 106 can be implemented, in whole or in part, by other computing devices and/or components in the environment (e.g., the administrator device(s) 118 and/or the client device(s) 110). Additional description regarding the illustrated computing devices is provided with respect to FIG. 22 below.

As shown in FIG. 1, the server(s) 102 can include the tech-bio exploration system 104. In some embodiments, the tech-bio exploration system 104 can determine, store, generate, and/or display tech-bio information including maps of biology, biology experiments from various sources, and/or machine learning tech-bio predictions. For instance, the tech-bio exploration system 104 can analyze data signals corresponding to various treatments or interventions (e.g., compounds or biologics) and the corresponding relationships in genetics, proteomics, phenomics (i.e., cellular phenotypes), and invivomics (e.g., expressions or results within a living animal).

For instance, the tech-bio exploration system 104 can generate and access experimental results corresponding to gene sequences, protein shapes/folding, protein/compound interactions, phenotypes resulting from various interventions or perturbations (e.g., gene knockout sequences or compound treatments), and/or invivo experimentation on various treatments in living animals. By analyzing these signals (e.g., utilizing various machine learning models), the tech-bio exploration system 104 can generate or determine a variety of predictions and inter-relationships for improving treatments/interventions.

To illustrate, the tech-bio exploration system 104 can generate maps of biology indicating biological inter-relationships or similarities between these various input signals to discover potential new treatments. For example, the tech-bio exploration system 104 can utilize machine learning and/or maps of biology to identify a similarity between a first gene associated with disease treatment and a second gene (or compound) previously unassociated with the disease based on a similarity in resulting phenotypes (e.g., from phenomic digital images and phenomic image embeddings). The tech-bio exploration system 104 can then identify new treatments based on the gene (or compound) similarity (e.g., by targeting compounds the impact the second gene). Similarly, the tech-bio exploration system 104 can analyze signals from a variety of sources (e.g., protein interactions, or invivo experiments) to predict efficacious treatments based on various levels of biological data.

The tech-bio exploration system 104 can generate GUIs comprising dynamic user interface elements to convey tech-bio information and receive user input for intelligently exploring tech-bio information. Indeed, as mentioned above, the tech-bio exploration system 104 can generate GUIs displaying different maps of biology that intuitively and efficiently express complex interactions between different biological systems for identifying improved treatment solutions. Furthermore, the tech-bio exploration system 104 can also electronically communicate tech-bio information between various computing devices.

As shown in FIG. 1, the tech-bio exploration system 104 can include a system that facilitates various models or algorithms for generating maps of biology (e.g., maps or visualizations illustrating similarities or relationships between genes, proteins, diseases, compounds, and/or treatments) and discovering new treatment options over one or more networks. For example, the tech-bio exploration system 104 collects, manages, and transmits data across a variety of different entities, accounts, and devices. In some cases, the tech-bio exploration system 104 is a network system that facilitates access to (and analysis of) tech-bio information within a centralized operating system. Indeed, the tech-bio exploration system 104 can link data from different network-based research institutions to generate and analyze maps of biology.

As shown in FIG. 1, the tech-bio exploration system 104 can include a system that comprises the protein interaction learning system 106 that generates and/or displays predicted target results based on compound-protein machine learning representations. For example, the protein interaction learning system 106 can train and utilize a compound-protein interaction machine learning model to generate compound-protein machine learning representations (e.g., from match scores between compounds and proteins). The protein interaction learning system 106 can also utilize the compound-protein machine learning representations to train other target machine learning models to generate and/or display predicted target results.

As used herein, the term "machine learning model" includes a computer algorithm or a collection of computer algorithms that can be trained and/or tuned based on inputs to approximate unknown functions. For example, a machine learning model can include a computer algorithm with branches, weights, or parameters that changed based on training data to improve for a particular task. Thus, a machine learning model can utilize one or more learning techniques (e.g., supervised or unsupervised learning) to improve in accuracy and/or effectiveness. Example machine learning models include various types of decision trees (e.g., gradient boost models), support vector machines, Bayesian networks, random forest models, or neural networks (e.g., deep neural networks, generative adversarial neural networks, convolutional neural networks, recurrent neural networks, or diffusion neural networks).

As also illustrated in FIG. 1, the environment includes the client device(s) 110. For example, the client device(s) 110 may include, but is not limited to, a mobile device (e.g., smartphone, tablet) or other type of computing device, including those explained below with reference to FIG. 22. Additionally, the client device(s) 110 can include a computing device associated with (and/or operated by) user accounts for the tech-bio exploration system 104. Moreover, the environment can include various numbers of client devices that communicate and/or interact with the tech-bio exploration system 104 and/or the protein interaction learning system 106. For example, the client device(s) 110 can submit a request or query for a query compound and a predicted target result (e.g., whether a particular compound will pass the blood brain barrier), the protein interaction learning system 106 can generate the predicted target result and provide the predicted target result for display via the client device(s) 110.

Furthermore, in one or more implementations, the client device(s) 110 includes a client application. The client application can include instructions that (upon execution) cause the client device(s) 110 to perform various actions. For example, a user of a user account can interact with the client application on the client device(s) 110 to access tech-bio information, initiate a request for a machine learning prediction, initiate training of a machine learning model, and/or generate GUIs comprising a machine learning prediction/result.

As shown in FIG. 1, the environment can also include the testing device(s) 116. For instance, the testing device(s) 116 can include intelligent robotic devices and camera devices for generating and capturing digital images of cellular phenotypes resulting from different perturbations (e.g., genetic knockouts or compound treatments of stem cells). Similarly, the testing device(s) can include camera devices and/or other sensors (e.g., heat or motion sensors) capturing real-time information from animals as part of invivo experimentation. The tech-bio exploration system 104 can also interact with a variety of other testing device(s) such as devices for determining, generating, or extracting gene sequences or protein information.

As shown in FIG. 1, the environment also includes administrator device(s) 118. For example, the protein interaction learning system 106 can utilize the administrator device(s) 118 to control various functions or operations of the tech-bio exploration system 104 and/or the protein interaction learning system 106. To illustrate, the administrator device(s) 118 can identify/select training data, schedule or initiate training protocols, provide or generate training parameters, select particular target machine learning models, and/or schedule inference or application of machine learning models. The administrator device(s) 118 can also select target results for training target machine learning models.

As further shown in FIG. 1, the environment includes the network 108. As mentioned above, the network 108 can enable communication between components of the environment. In one or more embodiments, the network 108 may include a suitable network and may communicate using a various number of communication platforms and technologies suitable for transmitting data and/or communication signals, examples of which are described with reference to FIG. 22. Furthermore, although FIG. 1 illustrates computing devices communicating via the network 108, the various components of the environment can communicate and/or interact via other methods (e.g., communicate directly).

As mentioned above, in one or more implementations, the protein interaction learning system 106 trains and utilizes target machine learning models to generate predicted target results (and corresponding contributions) utilizing compound-protein machine learning representations. For example, FIG. 2 illustrates the protein interaction learning system 106 generating a predicted bioactivity result 216 utilizing a target machine learning model 214 (and graphical elements 222, 224a, 224b indicating protein contributions) in accordance with one or more embodiments.

Figure 2:
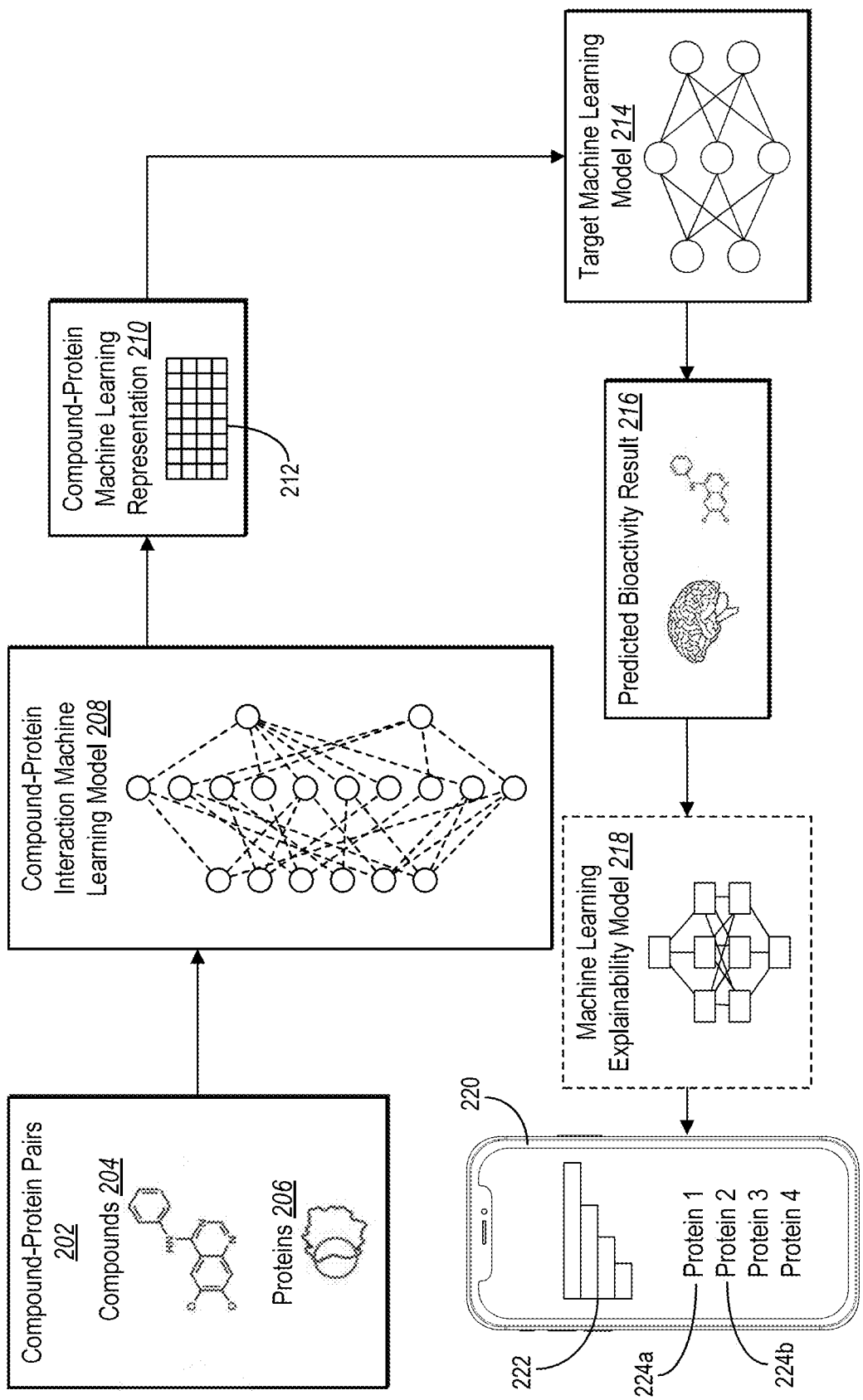
FIG. 2 illustrates generating a predicted target result utilizing a target machine learning model from a compound-protein machine learning representation in accordance with one or more embodiments.

In particular, FIG. 2 illustrates the protein interaction learning system 106 identifying compound-protein pairs 202. As used herein, the term "compound-protein pair" refers to a compound and a protein (or subpart of a protein). Thus, for example, a compound-protein pair can include a particular molecule and a protein that the molecule may interact with within a cell. For background, the body can transcribe genes within cells to generate proteins having particular features or characteristics, such as protein folds/pockets that provide potential binding sites for molecules/compounds. The protein interaction learning system 106 can identify compound-protein pairs to analyze in determining potential matches or binding probabilities for the compound relative to the protein (e.g., relative to a protein domain or potential binding site of a protein). A protein can have one or more protein pockets (i.e., binding sites). Thus, the protein interaction learning system 106 can identify multiple compound-protein pairs from a given molecule and corresponding protein (e.g., a first pair for a compound and a first protein pocket and a second pair for a compound and a second protein pocket). FIG. 2 illustrates an example compound 204 and an example protein 206.

In one or more implementations, the protein interaction learning system 106 identifies the compound 204 from a query transmitted from a client device. Thus, for example, a client device can provide a query compound and a target result. In response, the protein interaction learning system 106 can determine compound-protein pairs for the query compound and a plurality of proteins to generate a predicted target result corresponding to the target result transmitted from the client device.

As shown, the protein interaction learning system 106 analyzes the compound-protein pairs 202 utilizing a compound-protein interaction machine learning model 208. As used herein a "compound-protein interaction machine learning model" refers to a machine learning model that analyzes compounds and protein to generate a prediction. For instance, a compound-protein interaction machine learning model includes a classification machine learning model that generates predictions regarding binding probabilities for a compound and a protein. Thus, a compound-protein interaction machine learning model includes a deep neural network trained to generate binary predictions and/or match scores between a molecule and protein pocket binding site. Additional detail regarding the compound-protein interaction machine learning model 208 is provided below (e.g., in relation to FIG. 3).

As shown in FIG. 2, the protein interaction learning system 106 utilizes the compound-protein interaction machine learning model 208 to generate a compound-protein machine learning representation 210. As used herein, a "compound-protein machine learning representation" refers to a representation of compounds in relation to proteins, where the representation is generated by a machine learning model. For example, a compound-protein machine learning representation includes a collection of match scores (e.g., binding probabilities) generated by a machine learning model in relation to one or more compounds and one or more proteins. To illustrate, a compound-protein machine learning representation for a particular compound includes match scores between the compound and a plurality of proteins (or portions of proteins, such as protein domains and/or protein-pockets).

Indeed, as shown in FIG. 2, the compound-protein machine learning representation 210 includes match scores 212. As used herein, the term "match score" refers to a metric, score, or probability corresponding to a compound and a protein (generated by a machine learning model). For example, a match score can include a metric indicating a probability that a compound will bind to a protein or subpart of a protein (e.g., protein domain or particular binding site referred to herein as a protein-pocket). In one or more embodiments, the protein interaction learning system 106 generates the compound-protein machine learning representation 210 by combining match scores for particular protein pockets. Additional detail regarding the compound-protein machine learning representation 210 is provided below (e.g., in relation to FIG. 3).

As illustrated in FIG. 2, the protein interaction learning system 106 utilizes the compound-protein machine learning representation 210 to guide a target machine learning model 214 in generating a predicted bioactivity result 216. In particular, the target machine learning model 214 generates the predicted bioactivity result 216 by analyzing how the compound interacts with proteins as reflected in the compound-protein machine learning representation 210. As used herein, the term "target machine learning model" refers to a machine learning model trained or utilized to generate a predicted target result. Thus, a target machine learning model can include a decision tree (e.g., a gradient boost model, such as LightGBM) or another machine learning model, including a deep neural network.

As discussed previously, a predicted bioactivity result (or predicted target result) includes a prediction for a target bioactivity, biological feature or outcome. Thus, for instance a predicted bioactivity result can include an ADMET prediction, which refers to a prediction corresponding to absorption (e.g., compound/drug entering the bloodstream), distribution (compound/drug being distributed through the body to tissues and organs, such as solubility or permeability of body barriers), metabolism (chemical transformation of a compound/drug within the body), excretion (elimination of a compound/drug from the body), or toxicity (harmful effects of a compound/drug).

Similarly, a predicted target result includes a compound-induced biological perturbation. For instance, a biological perturbation program refers to a process for analyzing, identifying, or selecting compounds that demonstrate a particular biological activity. In particular, a biological perturbation program can include a process for identifying, filtering, and/or testing compounds that will impact a target gene (e.g., a gene identified as having a particular function or feature, such as a gene correlated with cancer). For example, a biological perturbation program can include hit selection (e.g., identifying compounds with statistically strong connections to target genes utilizing phenomic digital image embeddings), phenomic confirmation (e.g., confirming activities by automated similarity and concentration-response analytics), transcriptomics confirmation (e.g., confirming compound and gene relationships utilizing transcriptomics), and SAR confidence (identifying activities that behave as a series). Thus, a biological perturbation biological perturbation program can analyze a variety of different compounds, filter those compounds, and identify those compounds that have an impact relative to a particular biological activity (i.e., some compounds have no impact, some compounds will have a positive impact, and some compounds will have a negative impact). A biological perturbation program may seek to emulate the effect of a gene knockout, rescue the effect of a gene knockout, or otherwise correct a diseased cellular state. The protein interaction learning system 106 can utilize the target machine learning model 214 to predict the impact for compounds (i.e., impact predictions for whether the compounds will have an impact or be filtered out through the biological perturbation program) even before running the biological perturbation program for those compounds.

As used herein, a compound refers to a combination of elements and/or molecules. For example, a compound can include a drug for treating (or potentially treating) a disease. Similarly, an impact of a compound on a biological activity refers to an effect or impact of the compound relative to the biological activity. Thus, an impact on a biological perturbation program (e.g., a biological perturbation program prediction) can include an effect or impact of the compound relative to the biological activity. To illustrate, an impact of a compound on a target gene refers to an activity or effect of the compound relative to a function or feature of the target gene. For instance, for a gene that is known to create certain biological outcomes or activities in a cell, a compound that creates a similar outcome or activity has a high impact relative to the target gene. Thus, the protein interaction learning system 106 can generate impact predictions (e.g., biological perturbation program predictions) between compounds and target genes (e.g., indicating whether the compound will be filtered out in the process of a biological perturbation program or continue as a hit after conclusion of a biological perturbation program). Additional detail regarding generating predicted bioactivity results, including ADMET predictions and impact predictions (e.g., biological perturbation program predictions) is provided below (e.g., in relation to FIGS. 5 and 11).

As further shown in FIG. 2, the protein interaction learning system 106 also utilizes a machine learning explainability model 218 to identify contributions of proteins (and/or compounds) in generating the predicted bioactivity result 216. As used herein, an explainability model (or machine learning explainability model) refers to a computer-implemented model that determines a measure of importance (or marginal contribution) for features analyzed by a machine learning model in making a prediction. For example, a machine learning explainability model can include a computer-implemented algorithm that decomposes the output of a machine learning model by the sums of the impact of each feature. In one or more embodiments, a machine learning explainability model perturbs the input features for a machine learning model and analyzes the predicted results. The machine learning explainability model can generate nodes representing the features-result combinations and generate edges that represent the marginal contribution of features that differ between the nodes. The protein interaction learning system 106 can utilize a variety of explainability models. In some implementations, the protein interaction learning system 106 utilizes a SHAP model and corresponding Shapley values for the measure of importance or marginal contribution for individual features.

Significantly, because the target machine learning model 214 utilizes the compound-protein machine learning representation 210 to generate the predicted bioactivity result 216, the protein interaction learning system 106 can utilize the machine learning explainability model 218 to determine the importance or contribution of particular proteins in generating the predicted bioactivity result 216. This significantly improves the functionality of the protein interaction learning system 106 relative to conventional systems, because the protein interaction learning system 106 can identify what compound-protein interactions are contributing to the predicted result.

For instance, the protein interaction learning system 106 can analyze contribution values and generate/select contributing proteins to provide for display. For instance, in some implementations, the protein interaction learning system 106 selects a subset of proteins (i.e., contributing proteins) above a particular threshold (e.g., a threshold percentage, a threshold number, or a threshold contribution value) and displays the proteins to client devices. In particular, the protein interaction learning system 106 displays contributing proteins with the predicted target result to provide an explanation regarding the potential underlying biological drivers for the predicted target result.

Thus, as shown in FIG. 2, the protein interaction learning system 106 provides, for display, via a client device 220 one or more proteins contributing to the predicted bioactivity result 216. Specifically, the client device 220 displays a graphical element 222 that indicates a plurality of proteins and their relative contribution to the predicted bioactivity result 216 (e.g., in the form of a bar graph, where the length of the bar indicates the importance/contribution). Similarly, the client device 220 displays graphical elements 224a, 224b that identify particular proteins contributing to the predicted bioactivity result 216 (e.g., the top threshold number of proteins or the proteins that satisfy a particular contribution threshold). For example, the protein interaction learning system 106 can predict that a particular compound is likely to pass the blood brain barrier and provide an indication (via the client device 220) that the most likely contributing factor in that prediction is the interaction between a compound and a particular protein, protein domain, or protein pocket. Accordingly, the protein interaction learning system 106 generates, utilizing a machine learning explainability model, one or more proteins contributing to the predicted target result Additional detail regarding the machine learning explainability model 218 and displaying contributing features is provided below (e.g., in relation to FIGS. 9, 10A-10D, 12-16).

As discussed previously, in one or more implementations, the protein interaction learning system 106 generates proteome features for compounds in the form of compound-protein machine learning representations. For example, FIG. 3 illustrates generating compound-protein machine learning representations in accordance with one or more embodiments.

Figure 3:
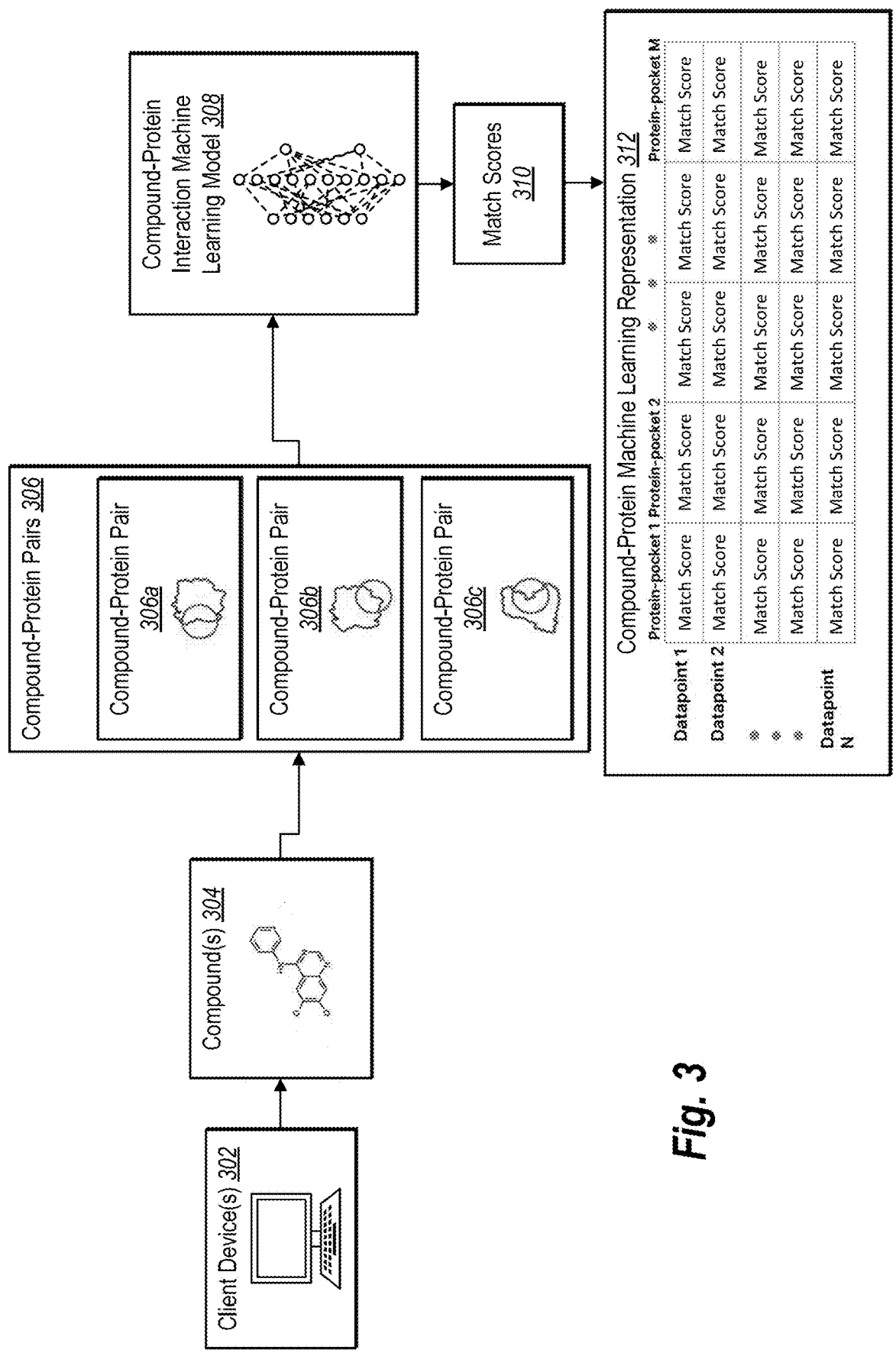
FIG. 3 illustrates generating compound-protein machine learning representations utilizing a compound-protein interaction machine learning model in accordance with one or more embodiments.

Specifically, FIG. 3 illustrates the protein interaction learning system 106 receiving compound(s) 304 from a client device 302. For example, the client device 302 can identify certain query compounds of interest for a particular target result. The protein interaction learning system 106 can provide a graphical user interface to the client device 302 and, based on user interaction with the graphical user interface, the protein interaction learning system 106 can identify query compounds and a target result. Thus, for example, the client device 302 can select a first compound and a second compound and the target result of human intestinal absorption.

As shown in FIG. 3, the protein interaction learning system 106 identifies compound-protein pairs 306 for the compound(s) 304. For instance, in the case of a single compound, the protein interaction learning system 106 can identify a set of proteins (or protein domains or protein-pockets) and combine the compound with the set of proteins to generate the compound-protein pairs 306. Thus, as shown, the protein interaction learning system 106 determines a first compound-protein pair 306a (e.g., comprising the compound and a first protein-pocket of a first protein), a second compound-protein pair 306b (e.g., comprising the compound and a second protein-pocket of the first protein), and a third compound-protein pair 306c (e.g., comprising the compound and a third protein-pocket of a second protein). Although the foregoing example utilizes a single compound, the protein interaction learning system 106 can generate compound-protein pairs for additional compounds (e.g., generate a fourth compound-protein pair comprising a second compound and the first protein-pocket of the first protein).

The protein interaction learning system 106 can also extract and/or generate a variety of features corresponding to the compound-protein pairs 306. For example, the protein interaction learning system 106 can generate/extract local protein features (e.g., features regarding local protein pockets, such as binding site features, graph descriptions, pocket shapes, atom type descriptors), global protein features (e.g., features regarding a protein as a whole, such as the structures and sequence of a protein), protein functional features (e.g., functions or purposes of a particular protein or protein pocket), and/or compound/ligand fingerprints (ligand/compound structure in a descriptor format such as a SMILES representation of underlying molecules using a fixed length vector or another fingerprinting method such as graph-based fingerprints, torsion fingerprints, or pharmacophore fingerprints).

As illustrated in FIG. 3, the protein interaction learning system 106 analyzes the compound-protein pairs 306 (and corresponding features) utilizing the compound-protein interaction machine learning model 308 to generate match scores 310. As mentioned above, in one or more implementations, the compound-protein interaction machine learning model 308 includes a classification machine learning model trained to determine whether a compound will bind to a particular protein, protein domain, or protein pocket (e.g., binding site). The compound-protein interaction machine learning model 308 can utilize a variety of features regarding compounds and/or proteins in generating the match scores 310. Indeed, as discussed above, the protein interaction learning system 106 can determine local protein features, global protein features, protein functional features, and/or compound/ligand fingerprints for the compound-protein pairs 306. The compound-protein interaction machine learning model 308 can analyze these features for the compound-protein pairs 306 and generate the match scores 310.

As discussed above in relation to FIG. 2, the compound-protein interaction machine learning model 308 can include a variety of machine learning model architectures. In some implementations, the compound-protein interaction machine learning model 308 includes supervised discriminative classifications or regression models such as a random forest, support vector machine, single layer perceptron, or multiple layer artificial neural network. In some embodiments, the compound-protein interaction machine learning model takes the form of fully-connected neural network with a feature input layer, two hidden layers with, for example, 512 and 256 nodes, respectively, and two output nodes corresponding to interacting and non-interacting pairs. In some embodiments, an artificial neural network with multiple hidden layers omits connections between input types, for the creation of separate latent spaces representing ligand fingerprints, global protein features, local protein features, and protein functional features.

In some implementations, the protein interaction learning system 106 trains the compound-protein interaction machine learning model 308 to generate binary predictions for binding sites. The protein interaction learning system 106 then strips one or more layers from the trained compound-protein interaction machine learning model to determine a match score (e.g., binding likelihood indicating a likelihood that the compound will bind to the corresponding protein) for compound-protein pairs. In some implementations, the match score can include a binary score (e.g., indicating that a compound will or will not bind at the binding site).

In one or more embodiments, the protein interaction learning system 106 trains the compound-protein interaction machine learning model by identifying a plurality of ghost ligands/compounds (and confidence scores) relative to particular proteins. In particular, the protein interaction learning system 106 generates synthetic data by determining ghost compounds similar to selected compounds and proteins based on the confidence scores. The protein interaction learning system 106 trains the compound-protein interaction machine learning model based on features corresponding to known and synthetic compounds and proteins. For example, in one or more implementations, the protein interaction learning system 106 trains and utilizes a compound-protein interaction machine learning model as described in METHOD AND SYSTEM FOR PREDICTING DRUG BINDING USING SYNTHETIC DATA, application Ser. No. 17/420,582, filed Jan. 2, 2020, which is incorporated by reference herein in its entirety.

As illustrated in FIG. 3, the compound-protein interaction machine learning model 308 generates the match scores 310 and the protein interaction learning system 106 combines the match scores 310 to generate the compound-protein machine learning representation 312. The protein interaction learning system 106 can generate the compound-protein machine learning representation 312 in a variety of forms. For instance, as illustrated, the protein interaction learning system 106 can generate the compound-protein machine learning representation 312 as an array or table where individual fields represent individual match scores for a corresponding compound-protein pair. For example, rows can refer to compound data points and columns can refer to proteins (or protein domains or protein-pockets). The protein interaction learning system 106 can also generate the compound-protein machine learning representation as a vector representation, where individual positions within the vector represent match scores for particular compound-protein pairs. The protein interaction learning system 106 can also utilize one-hot encoding or another encoding model to generate a numerical representation from the match scores.

Thus, to illustrate, the protein interaction learning system 106 generates a first match score indicating a first binding likelihood for a first compound and a first pocket of a first protein. The protein interaction learning system 106 generates (utilizing the compound-protein interaction machine learning model 308) a second match score indicating a second binding likelihood for the first compound and a second pocket of a second protein. The protein interaction learning system 106 can generate a compound protein-pocket machine learning representation for the first compound by combining the first match score and the second match score.

Similarly, the protein interaction learning system 106 generates a third match score indicating a third binding likelihood for a second compound and the first pocket of the first protein. The protein interaction learning system 106 generates (utilizing the compound-protein interaction machine learning model 308) a fourth match score indicating a fourth binding likelihood for the second compound and the second pocket of the second protein. The protein interaction learning system 106 can generate a compound protein-pocket machine learning representation for the second compound by combining the first match score and the second match score.

As mentioned above, in one or more implementations, the protein interaction learning system 106 refines protein features utilizing normalization and/or a protein confidence filter. For example, FIG. 4 illustrates the protein interaction learning system 106 generating refined features 412 utilizing a protein confidence filter 402 and a normalization model 408 in accordance with one or more embodiments.

Figure 4:
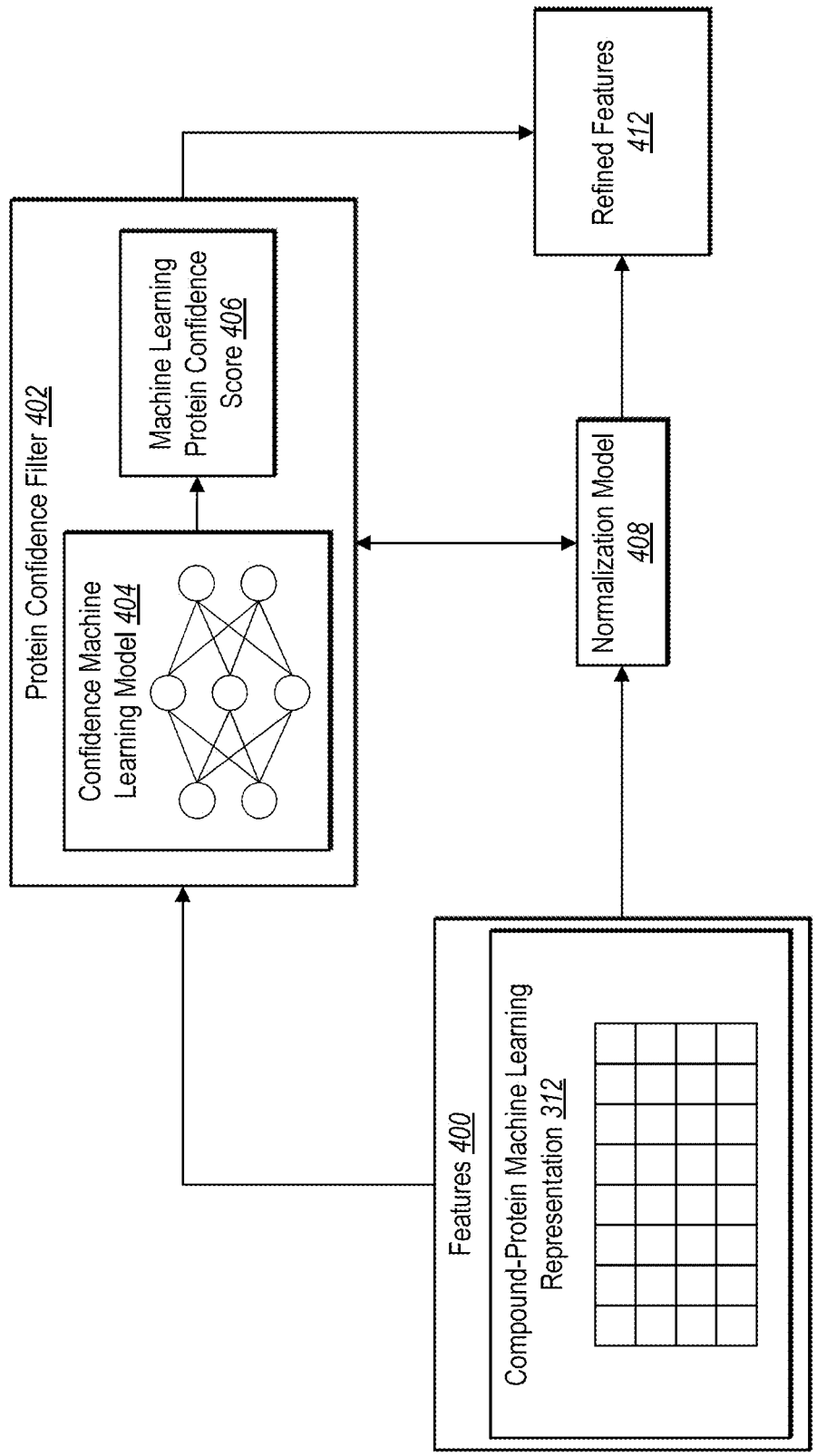
FIG. 4 illustrates generating refined protein features utilizing a protein confidence filter and a normalization model in accordance with one or more embodiments.

Specifically, FIG. 4 illustrates features 400 (e.g., protein features). The features 400 can include a variety features discussed herein, including the compound-protein machine learning representation 312 (as described in relation to FIG. 3). The protein interaction learning system 106 applies the protein confidence filter 402 to remove one or more features from the features 400. In particular, the protein confidence filter 402 removes features where the compound-protein interaction machine learning model 308 is predicted to perform below a particular threshold confidence accuracy.

Notably, the protein interaction learning system 106 can apply the protein confidence filter 402 before applying the compound-protein interaction machine learning model 308 or after applying the compound-protein interaction machine learning model 308. For example, in some implementations, the protein interaction learning system 106 applies the protein confidence filter 402 to generate the refined features 412 to reduce the amount of information or features processed by the compound-protein interaction machine learning model 308 and further reduce corresponding computer resources. In some implementations, the protein interaction learning system 106 applies the compound-protein interaction machine learning model 308 and then the protein interaction learning system 106 filters match scores from the compound-protein machine learning representation 312 (e.g., to generate the refined features 412 such as a refined compound-protein machine learning representation).

As shown in FIG. 4, the protein interaction learning system 106 utilizes a confidence machine learning model 404 to generate a machine learning protein confidence score 406. As used herein, a confidence machine learning model refers to a machine learning model trained and utilized to generate a machine learning protein confidence score. In particular, a confidence machine learning model includes a machine learning model trained to predict a measure of confidence or accuracy of a compound-protein interaction machine learning model (e.g., in generating a prediction that compounds will (or will not) interact with a protein. For example, the confidence machine learning model can include a deep neural network trained to predict a machine learning protein confidence score indicating a predicted accuracy or confidence of a match score for a protein.

In one or more implementations, the protein interaction learning system 106 trains the confidence machine learning model 404. In particular, the protein interaction learning system 106 generates predicted confidence scores from protein features (e.g., global protein features, local protein features, and/or protein functional features) of a particular protein. The protein interaction learning system 106 then compares the predicted confidence scores with measured accuracy (e.g., ground truth compound-protein bindings) for the particular protein. The protein interaction learning system 106 can determine a measure of loss between the predicted confidence scores and the measured accuracy (utilizing a loss function) and train the confidence machine learning model by modifying parameters based on the measure of loss. For example, the protein interaction learning system 106 can utilize back propagation and gradient descent to modify parameters to reduce the measure of loss over time and generate more accurate protein confidence scores.

Upon training, the protein interaction learning system 106 utilizes the confidence machine learning model 404 to generate the machine learning protein confidence scores 406. Moreover, the protein interaction learning system 106 then filters features from the features 400 based on the machine learning protein confidence scores 406. For example, the protein interaction learning system 106 can identify a threshold confidence, compare the threshold confidence to the protein confidence scores 406, and remove particular features that correspond to protein confidence scores that fail to satisfy (e.g., fall below) the threshold confidence.

To illustrate, the protein interaction learning system 106 can provide protein features for a first protein to the confidence machine learning model 404. The confidence machine learning model 404 generates a machine learning protein confidence score of 0.4, indicating that the compound-protein interaction machine learning model 308 is only 40 percent accurate in generating match scores for the first protein. The protein interaction learning system 106 can compare the machine learning protein confidence score (e.g., 0.4) to a threshold confidence (e.g., 0.7) and determine that the machine learning protein confidence score fails to satisfy the threshold confidence. In response, the protein interaction learning system 106 removes features for the first protein from the features 400 (e.g., removes datapoints or match scores from the compound-protein machine learning representation 312).

As shown in FIG. 4, the protein interaction learning system 106 also applies a normalization model 408 to the features 400. For example, the protein interaction learning system 106 can utilize a normalization model to account for several feature variations. The protein interaction learning system 106 can apply a variety of normalization models, such as clipping normalization, log scaling normalization, or z-score normalization. Thus, based on the protein confidence filter 402 and/or the normalization model 408, the protein interaction learning system 106 generates refined features 412.

The protein interaction learning system 106 can utilizes the refined features 412 for training and/or implementation of a target machine learning model. For example, the protein interaction learning system 106 can utilizes the refined features 412 as training input to a target machine learning model for modifying parameters of the target machine learning model (e.g., as described below in relation to FIGS. 6, 7, and 8). In addition, the protein interaction learning system 106 can utilize the refined features 412 as input to a trained target machine learning model to generate predicted target results for a query compound.

As discussed above, in one or more implementations, the protein interaction learning system 106 utilizes target machine learning models to generate a variety of predicted target results. For example, FIG. 5 illustrates the protein interaction learning system 106 utilizing target machine learning models to generate predicted bioactivity result classifications from a compound-protein machine learning representation (and other optional features) in accordance with one or more embodiments.

Figure 5:
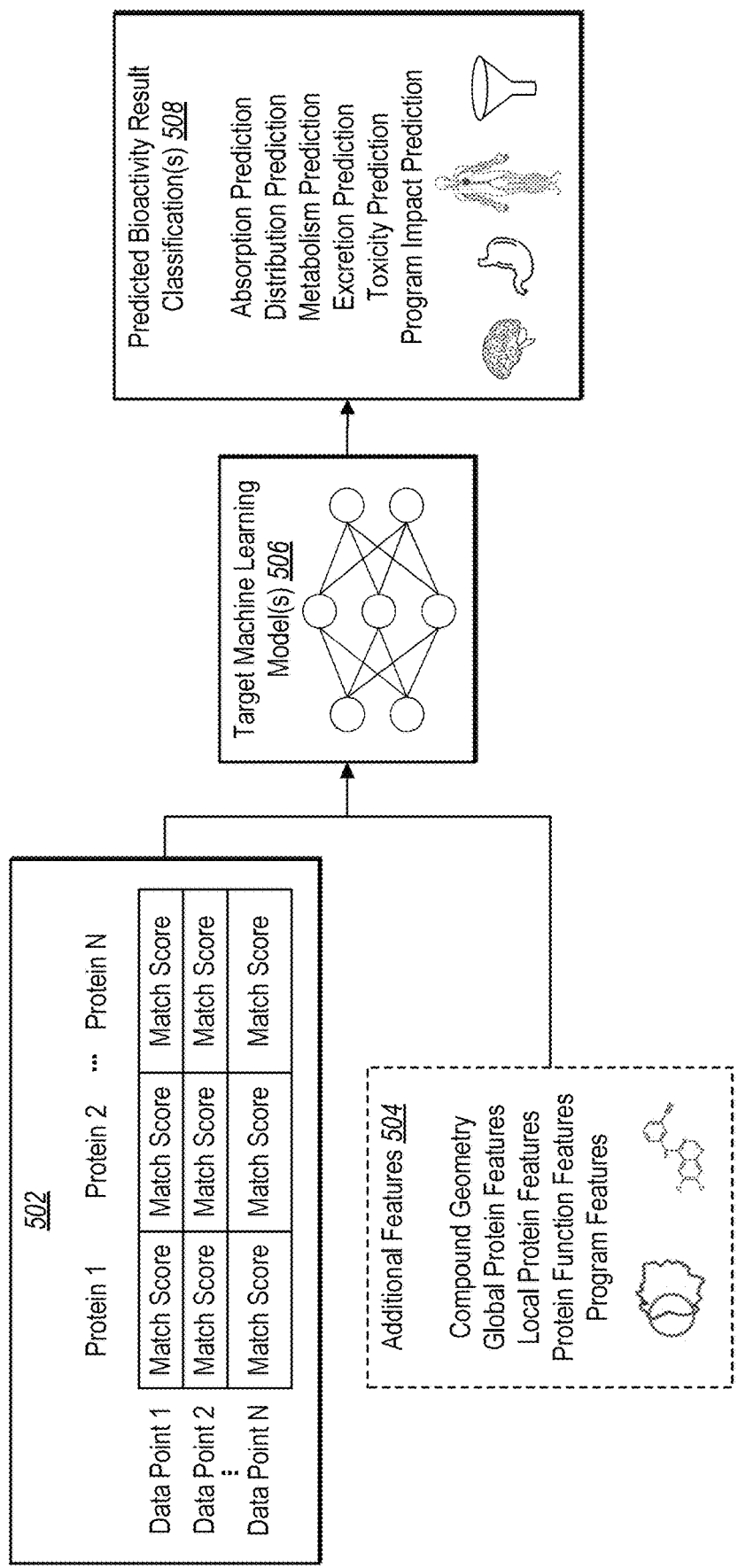
FIG. 5 illustrates utilizing target machine learning models to generated predicted target results from a compound-protein machine learning representation in accordance with one or more embodiments.

Specifically, FIG. 5 illustrates a compound-protein machine learning representation 502 (e.g., the compound-protein machine learning representation 312 or the refined features 412). As shown, the protein interaction learning system 106 utilizes one or more target machine learning model(s) 506 to analyze the compound-protein machine learning representation 502 and (optionally) additional features 504. As illustrated, the additional features 504 can include a variety of different signals corresponding to a particular predicted target result. Thus, for example, the additional features 504 can include compound geometry (e.g., a digital representation of chemical geometric properties of one or more compounds). The additional features 504 can also include global protein features, local protein features, or protein function features (as discussed previously). Similarly, the additional features can include program features such as features of a target gene for a biological perturbation program. Accordingly, in addition to the compound-protein machine learning representation 512, the protein interaction learning system 106 can extract and utilize a variety of additional input features (e.g., a variety of features referenced herein) for determining predicted target result classifications.

As shown, the protein interaction learning system 106 utilizes the target machine learning model(s) 506 to analyze the compound-protein machine learning representation 512 and the additional features 504 to generate one or more predicted bioactivity result classification(s) 508. In one or more implementations, the protein interaction learning system 106 trains and utilizes a particular target machine learning model to generate a particular predicted target result classification. Thus, for example, the protein interaction learning system 106 trains a first target machine learning model to generate an absorption prediction, trains a second target machine learning model to generate a metabolism prediction, and trains a third target machine learning model to generate a biological perturbation program prediction. Similarly, the protein interaction learning system 106 can train a target machine learning model to generate impact predictions for biological perturbation programs. In some implementations, the protein interaction learning system 106 trains a first target machine learning model for a first biological perturbation program (of a first target gene), a second target machine learning model for a biological perturbation program (of a second target gene), etc.

Moreover, in some implementations, the protein interaction learning system 106 trains multiple target machine learning models for different predictions within one of the illustrated prediction types. For example, in one or more embodiments, the protein interaction learning system 106 generates a different target machine learning models to generate different distribution predictions (e.g., multiple target machine learning models for predictions related to compounds passing different barriers of different parts of the human body). Indeed, because the compound-protein machine learning representation 502 reflects compound interactions within a general protein space, the protein interaction learning system 106 can utilizes the compound-protein machine learning representation 502 to in conjunction with the target machine learning model(s) 506 to generate predicted target result classifications for an array of biological processes that involve interactions between compounds and proteins.

Although not illustrated in FIG. 5, in one or more implementations, the protein interaction learning system 106 generates the predicted bioactivity result classification(s) 508 based on a query from a client device. For instance, the protein interaction learning system 106 provides a user interface to a client device for user selection of a query. In particular, the protein interaction learning system 106 can provide a user interface that comprises a query compound selection element (e.g., for selecting a query compound) and a target result selection element (e.g., for selecting a target result). To illustrate, the query compound selection element can include a drop-down menu or other user interface element (e.g., scroll bar, text field) for selecting of a query compound from a plurality of compounds. Similarly, the target result selection element can include a drop-down menu or other interface element for selecting a target result from a plurality of results. For instance, the protein interaction learning system 106 can receive a selection of an ADMET target such as a blood brain barrier result from the other various results illustrated in FIG. 5 or described herein. In addition, the protein interaction learning system 106 can receive a selection of a target biological perturbation program corresponding to a target gene or another target biological activity.

In response to receiving a query comprising a query compound and/or target result, the protein interaction learning system 106 can perform the process illustrated in FIG. 5 and generate a predicted target result. For example, the protein interaction learning system 106 can generate a compound-protein machine learning representation for the target compound. Specifically, the protein interaction learning system 106 can utilize a compound-protein interaction machine learning model to generate a compound-protein machine learning representation for the query compound and a plurality of proteins. For instance, the protein interaction learning system 106 generates match scores between the compound and proteins. The protein interaction learning system 106 combines the match scores to generate the compound-protein machine learning representation. In some embodiments, the protein interaction learning system 106 can store match scores (previously generated by the compound-protein interaction machine learning model) and generate the compound-protein machine learning representation by accessing and combining the match scores from a database or other digital repository.

Further, the protein interaction learning system 106 can provide the predicted target result for display via the client device. For example, the protein interaction learning system 106 can provide an indication that the query compound will pass the blood brain barrier. The protein interaction learning system 106 can also provide for display a measure of confidence with regard to the prediction, contributing proteins, and/or contribution values corresponding to the contributing proteins (e.g., as described in greater detail below with regard to FIG. 9).

To provide specific illustrations, consider a first query received from a client device, where the first query comprises a first query compound and a human oral bioavailability target result. The protein interaction learning system 106 generates a compound-protein machine learning representation that indicates interactions between the first query compound and a variety of proteins. The protein interaction learning system 106 analyzes the compound-protein machine learning representation utilizing a target machine learning model trained to generate predicted human oral bioavailability results to generate a predicted target result classification (e.g., a positive classification for human oral bioavailability). The protein interaction learning system 106 provides the predicted target result classification (together with proteins contributing to that result) to the client device. Although the foregoing example relates to a single query compound, the protein interaction learning system 106 can perform a similar process in response to receiving a query comprising multiple query compounds.

Consider a second query received from the client device, where the second query comprises one or more query compounds and a target impact prediction for a biological perturbation program for a target gene. For instance, the client device can select the target gene utilizing a target result interface element. The protein interaction learning system 106 can generate one or more compound-protein machine learning representation for the one or more query compounds (e.g., by combining match scores for the one or more query compounds). The protein interaction learning system 106 can then analyze the compound-protein machine learning representation utilizing a target machine learning model trained to generate impact predictions for one or more biological perturbation programs. Utilizing the trained target machine learning model, the protein interaction learning system 106 generates one or more impact predictions for the one or more query compounds (e.g., the compound will succeed or be identified as a hit in the biological perturbation program). The protein interaction learning system 106 can then provide the one or more impact predictions for display (together with proteins contributing that result).

As mentioned above, in one or more implementations, the protein interaction learning system 106 utilizes a unique compound clustering cross-validation approach in training a target machine learning model. For example, FIG. 6 illustrates utilizing a clustering algorithm and compound features to divide a dataset for cross-validation in accordance with one or more embodiments.

Figure 6:
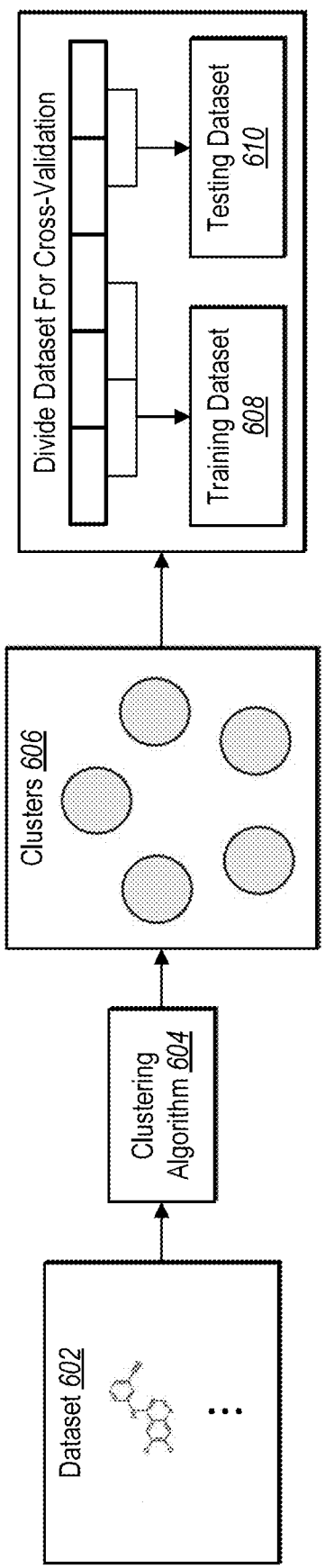
FIG. 6 illustrates utilizing a clustering algorithm and compound features to divide a dataset for cross-validation in accordance with one or more embodiments.

In particular, FIG. 6 illustrates a dataset 602 that includes features for training a target machine learning model (e.g., the features described in regard to FIG. 5). Experimenters discovered that conventional division of a dataset could result in technical problems in training and testing a target machine learning model because the training and testing dataset would include compounds having similar underlying characteristics or features. Accordingly, in one or more implementations, the protein interaction learning system 106 analyzes the dataset 602 utilizing the clustering algorithm 604 to cluster compounds having similar features and improve cross-validation (e.g., such that training dataset does not include significant geometric overlap with the testing dataset).

For example, the dataset 602 can include individual datapoints corresponding to particular compounds. Thus, for example, a datapoint can include a compound-protein pair and additional features (as described in relation to FIG. 5). The protein interaction learning system 106 can determine a chemical fingerprint (representing compound geometry features) and apply the clustering algorithm 604 to the chemical fingerprint.

In particular, as illustrated, the protein interaction learning system 106 generates clusters 606 from the dataset 602 utilizing the clustering algorithm 604. The protein interaction learning system 106 can apply a variety of different clustering algorithms. As used herein, a clustering algorithm refers to a computer-implemented model for identifying groups or clusters having common or related features. For example, in some implementations, the protein interaction learning system 106 applies k-means clustering, DBSCAN, or spectral clustering to the chemical fingerprint to generate datapoint clusters (e.g., compound clusters) from the dataset 602. In one or more implementations, the protein interaction learning system 106 selects a certain number of the clusters 606 to generate. For example, the protein interaction learning system 106 can generate five clusters (or a different number of clusters, such as 3, 4, or 6).

As illustrated in FIG. 6, the protein interaction learning system 106 then splits/divides the dataset 602 based on the clusters 606. For example, the protein interaction learning system 106 can identify five clusters 606 of compounds based on compound geometry. Then, the protein interaction learning system 106 splits the dataset 602 so that datapoints are assigned to different divisions based on the compounds for each datapoint. Thus, if a first datapoint has a first compound corresponding to a first cluster, the protein interaction learning system 106 assigns the datapoint to a first dataset division/partition. As shown in FIG. 6, the protein interaction learning system 106 generates subsets of data for cross-validation (e.g., 5) based on the number of the clusters 606.

As shown in FIG. 6, the protein interaction learning system 106 generates a training dataset 608 and a testing dataset 610 from the dataset 602 based on the subsets of data. As used herein, a training dataset refers to a dataset utilized to train (e.g., modify parameters) of a machine learning model. A testing dataset refers to a dataset utilized to analyze or test the accuracy or results of a machine learning model.

For example, the protein interaction learning system 106 assigns three subsets of data (corresponding to three of the clusters 606) for the training dataset 608. Moreover, the protein interaction learning system 106 assigns two subsets of data (corresponding to the remaining two clusters of the clusters 606) to the testing dataset 610. The protein interaction learning system 106 then proceeds to train a target machine learning model utilizing the training dataset 608 and evaluate performance of the target machine learning model utilizing the testing dataset 610.

Although FIG. 6 illustrates a particular number of clusters, subsets of data, and assignment of subsets of data to particular datasets, the protein interaction learning system 106 can utilize a variety of different approaches in dividing a dataset between training and testing. Thus, for example, in some implementations, the protein interaction learning system 106 assigns three subsets of data to testing and one subset of data to testing. In some implementations, the protein interaction learning system 106 generates ten clusters and ten subsets of data, assigning five to training and five to testing.

As just mentioned, in one or more embodiments, the protein interaction learning system 106 trains target machine learning models (e.g., utilizing supervised machine learning approaches) to generate predicted target results from compound-protein-machine learning representations. For example, FIG. 7 illustrates training a target machine learning model utilizing a compound-protein machine learning representation in accordance with one or more embodiments.

Figure 7:
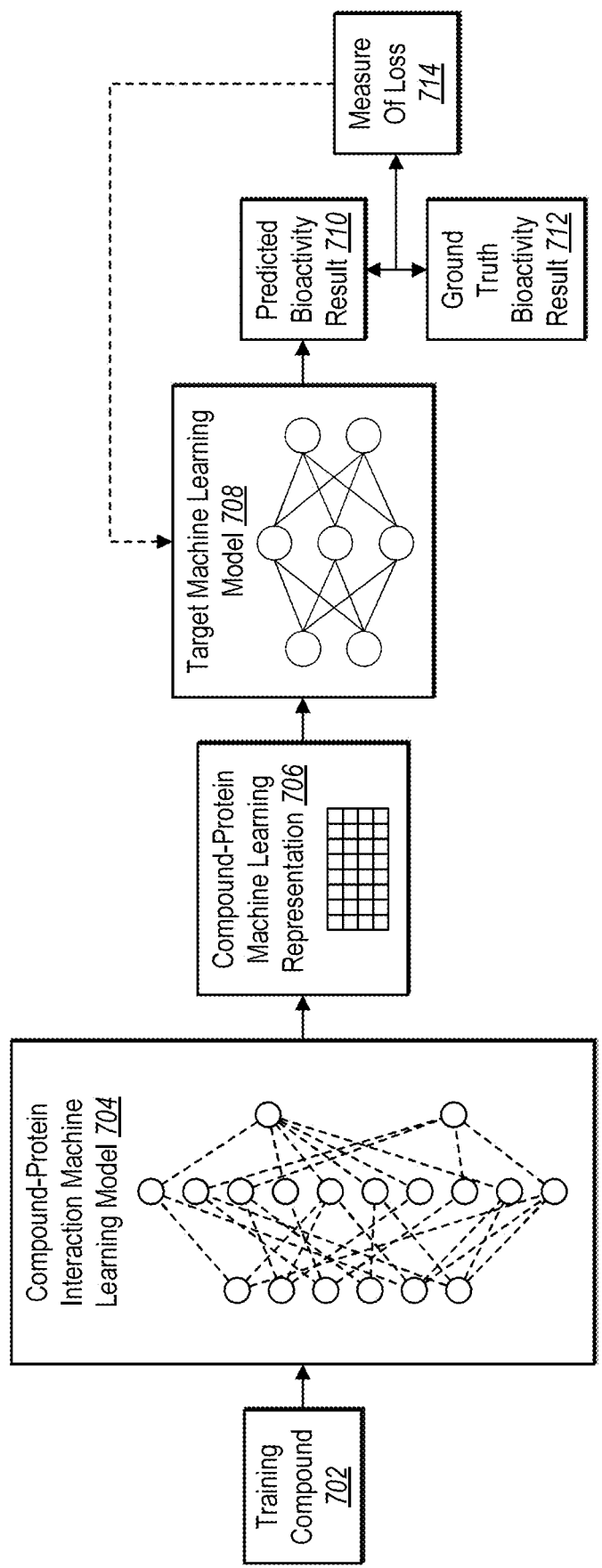
FIG. 7 illustrates training a target machine learning model utilizing a compound-protein machine learning representation in accordance with one or more embodiments.

Specifically, FIG. 7 illustrates the protein interaction learning system 106 generating a compound-protein machine learning representation 706 from a training compound 702 utilizing a compound-protein interaction machine learning model 704. In particular, as discussed above, the protein interaction learning system 106 generates compound-protein pairs for the training compound 702 (and corresponding features). The protein interaction learning system 106 analyzes the compound-protein pairs utilizing the compound-protein interaction machine learning model 704 to generate match scores between the training compound 702 and various proteins (or protein domains or protein pockets). The protein interaction learning system 106 combines the match scores to generate the compound-protein machine learning representation 706. For example, the protein interaction learning system 106 concatenates the match scores for the compound-protein pairs.

As illustrated, the protein interaction learning system 106 utilizes the target machine learning model 708 to generate a predicted bioactivity result 710 from the compound-protein machine learning representation 706. For example, the protein interaction learning system 106 can utilize layers of a neural network to analyze the compound-protein machine learning representation 706 at different levels of abstraction to generate the predicted bioactivity result 710. Similarly, the protein interaction learning system 106 can utilize branches of a decision tree to analyze the compound-protein machine learning representation 706 at different levels of abstraction to generate the predicted bioactivity result 710.

In one or more implementation, the target machine learning model 708 analyzes the compound-protein machine learning representation 706 together with other features, such as the additional features 504 described in relation to FIG. 5. Furthermore, the protein interaction learning system 106 can refine the features analyzed by the target machine learning model as described in FIG. 4 in relation to the refined features 412. In some implementations, the protein interaction learning system 106 can utilize a training dataset by applying a similarity datapoint filter and/or protein confidence filter (e.g., as described below in relation to FIG. 11). Moreover, the target machine learning model 708 can be trained to generate a variety of predicted target results (e.g., the predicted bioactivity result classification(s) 508).

As shown in FIG. 7, upon generating the predicted bioactivity result 710, the protein interaction learning system 106 compares the predicted bioactivity result 710 with a ground truth bioactivity result 712. For example, the target machine learning model 708 can generate an ADMET prediction (e.g., that the training compound 702 will pass the blood brain barrier). The ground truth bioactivity result 712 can indicate a measured or known result (e.g., a measured ADMET result) of whether the training compound 702 will pass the blood brain barrier.

Although the foregoing example describes an ADMET result and a measured ADMET result, the protein interaction learning system 106 can also generate a predicted bioactivity result comprising an impact prediction for a target gene (i.e., a biological perturbation program prediction). In particular, the protein interaction learning system 106 can generate a biological perturbation program prediction for a biological perturbation program for identifying compounds impacting a biological activity (e.g., mimicking a target gene). For instance, the protein interaction learning system 106 generates, from the compound-protein machine learning representation 706 utilizing the target machine learning model 708, an impact prediction for the training compound 702. To illustrate, the protein interaction learning system 106 can predict whether the training compound 702 will be found to have had a threshold impact on the target gene (e.g., at the conclusion of the biological perturbation program).

As illustrated, the protein interaction learning system 106 can compare the predicted bioactivity result 710 and the ground truth bioactivity result 712 to determine a measure of loss. For example, the protein interaction learning system 106 can utilize a loss function to generate the measure of loss 714. The protein interaction learning system 106 can utilize a variety of loss functions such as mean squared error loss (MSE), mean absolute error loss, binary cross-entropy loss, categorical cross-entropy loss, sparse categorical cross-entropy loss, hinge loss, Huber loss, and/or Kullback-leibler divergence.

Based on the measure of loss 714, the protein interaction learning system 106 can modify parameters of the target machine learning model 708. As used herein, the term parameters refers to learnable or tunable components of a machine learning model. For example, parameters can include learnable weights within one or more layers of a neural network. Similarly, parameters can include learnable branches, nodes, thresholds, weights, or rules within a decision tree. For example, the protein interaction learning system 106 can utilize gradient descent and back-propagation to modify parameters (e.g., internal weights within layers) of a neural network based on the measure of loss 714. Similarly, the protein interaction learning system 106 can modify parameters (e.g., weights or other dynamic elements) within branches of a decision tree based on the measure of loss (e.g., to reduce the loss measure of loss 714 and make predictions align more accurately with ground truth data).

Thus, for example, the protein interaction learning system 106 can modify the parameters of the target machine learning model 708 by comparing an ADMET prediction to a measured ADMET result for the training compound 702 (in training the target machine learning model 708 to generate ADMET predictions. Similarly, in one or more implementations, the protein interaction learning system 106 can modify the parameters of the target machine learning model 708 by comparing an impact prediction with a ground truth impact (in training the target machine learning model 708 to generate impact predictions for a target gene).

The protein interaction learning system 106 can iteratively repeat the process illustrated in FIG. 7. For example, the protein interaction learning system 106 can iteratively analyze different training compounds and corresponding training features, generated predicted target results, determine a measure of loss, and modify parameters of the target machine learning model 708. The protein interaction learning system 106 can continue training until reaching a stopping condition (e.g., until utilizing all of the training data, reaching a threshold number of iterations, or until satisfying a threshold convergence measure).

To provide an example illustration, the protein interaction learning system 106 can identify a biological perturbation program for a target gene or bioactivity. For example, the biological perturbation program can aim to identify compounds mimicking a gene knockout or some other bioactivity (e.g., mimic the impact of another compound, killing cancer cells, etc.) The protein interaction learning system 106 can identify historical data for the biological perturbation program indicating a training compound and a ground truth biological perturbation result for the training compound (e.g., was the compound selected as a hit to pursue for the bioactivity as a result of the biological perturbation program). The protein interaction learning system 106 generates a compound-protein machine learning representation for the training compound, generates a predicted biological perturbation result (e.g., the compound will be selected as a hit). The protein interaction learning system 106 compares the predicted biological perturbation result with the ground truth biological perturbation result to determine a measure of loss and modifies the target machine learning model 708 based on the measure of loss to more accurately generate biological perturbation predictions for future compounds (e.g., relative to the target bioactivity).

Although FIG. 7 illustrates generating the compound-protein machine learning representation 706 in conjunction with training the target machine learning model 708, in some implementations, the protein interaction learning system 106 generates the compound-protein machine learning representation 706 for a variety of different training compounds and stores the compound-protein machine learning representation 706 (e.g., within a database or other storage repository). At training, the protein interaction learning system 106 can access the database to retrieve compound-protein machine learning representation 706 (and other training features) to generate the predicted bioactivity result 710. Thus, the protein interaction learning system 106 can generate the compound-protein machine learning representation 706 and separately access, retrieve, or receive the compound-protein machine learning representation 706 at training time.

Figure 8:
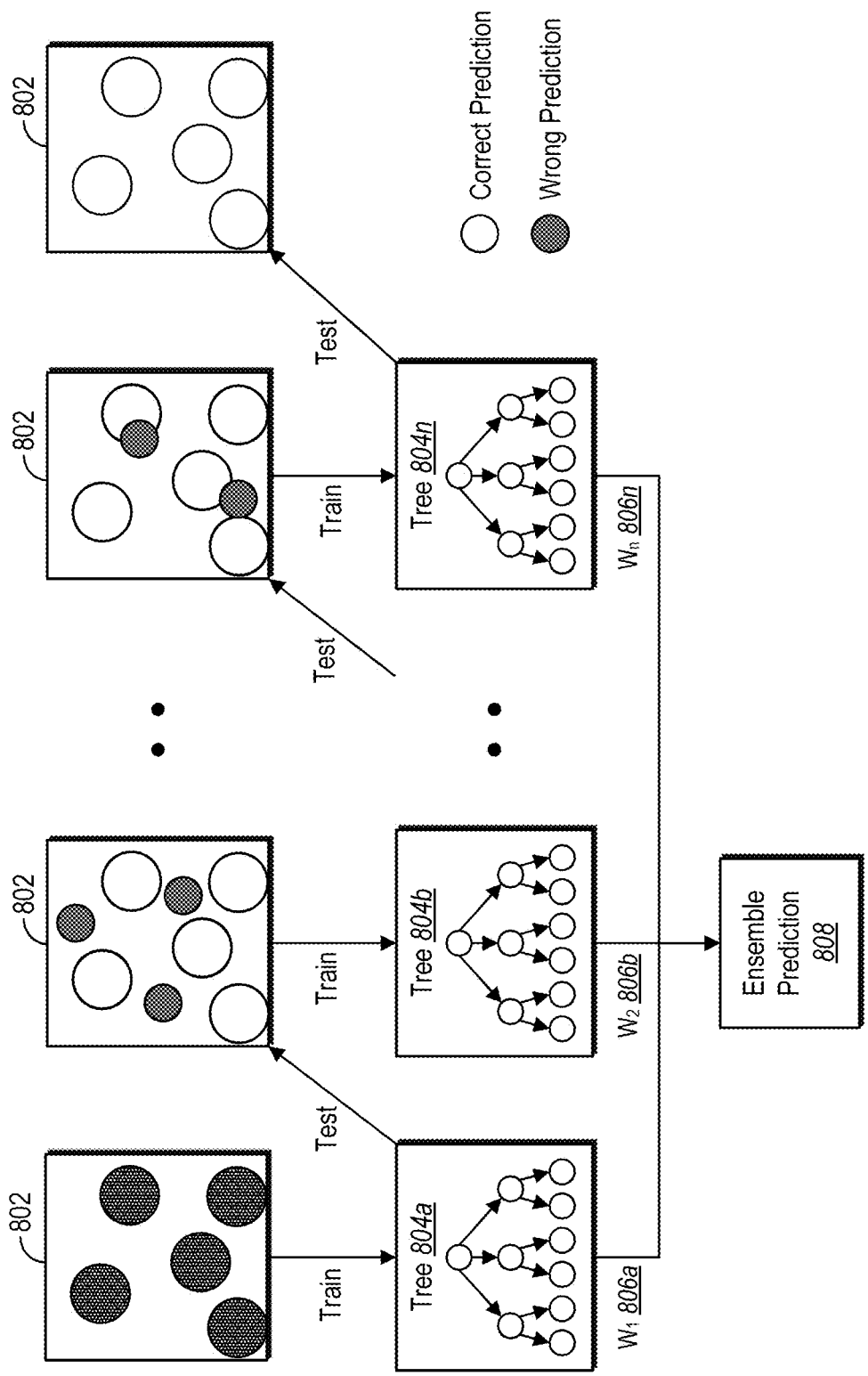
FIG. 8 illustrates training a gradient boost decision tree implementation of a target machine learning model in accordance with one or more embodiments.

As mentioned above, in one or more embodiments, the protein interaction learning system 106 utilizes a decision tree (e.g., gradient boost decision tree) to train a target machine learning model. For example, FIG. 8 illustrates training a gradient boost decision tree in accordance with one or more embodiments.

As illustrated, the protein interaction learning system 106 identifies a training dataset 802 and utilizes the training dataset to build a first tree 804a. For example, the protein interaction learning system 106 generates feature nodes that split the data of the decision tree to predict target results for the training dataset 802.

The protein interaction learning system 106 then tests the predictions of the first tree 804a (e.g., relative to ground truth). For example, as described above, the protein interaction learning system 106 can apply a loss function to determine a measure of loss utilized to modify parameters of the model (e.g., by building an additional tree). In particular, the protein interaction learning system 106 can take a gradient of the loss function with respect to the current predictions to calculate residuals. The protein interaction learning system 106 can then fit a second tree 804b to predict the residuals (e.g., to correct for the measure of loss from the first tree 804a).

The protein interaction learning system 106 can iteratively build trees to correct for the residual of previous tree parameters. Thus, as shown in FIG. 8, the protein interaction learning system 106 builds an additional tree 804n that corrects for the incorrect predictions of the previous trees.

The protein interaction learning system 106 can utilize the trees 804a-804n to generate an ensemble prediction 808 (e.g., a predicted target result). For instance, after constructing all the decision trees, the protein interaction learning system 106 can make predictions using each individual tree and combine the predictions to generate the ensemble prediction 808. In particular, the protein interaction learning system 106 can determine weights 806a-806n for the trees 804a-804n and utilize the weights to combine the predictions from the trees 804a-804n and generate the ensemble prediction 808.

Although FIG. 8 illustrates training a gradient boost decision tree model, the protein interaction learning system 106 can utilize a variety of different machine learning models and training approaches. Moreover, although FIG. 8 illustrates a particular number of trees with particular depths, the protein interaction learning system 106 can utilize a different number of trees of varying depths and parameters.

As mentioned previously, in one or more implementations, the protein interaction learning system 106 determines contributions (e.g., importance measures) for proteins in generating a predicted target result utilizing a target machine learning model. For example, FIG. 9 illustrates the protein interaction learning system 106 generating contributions for a predicted target result from a target machine learning model utilizing a machine learning explainability model in accordance with one or more embodiments.

Figure 9:
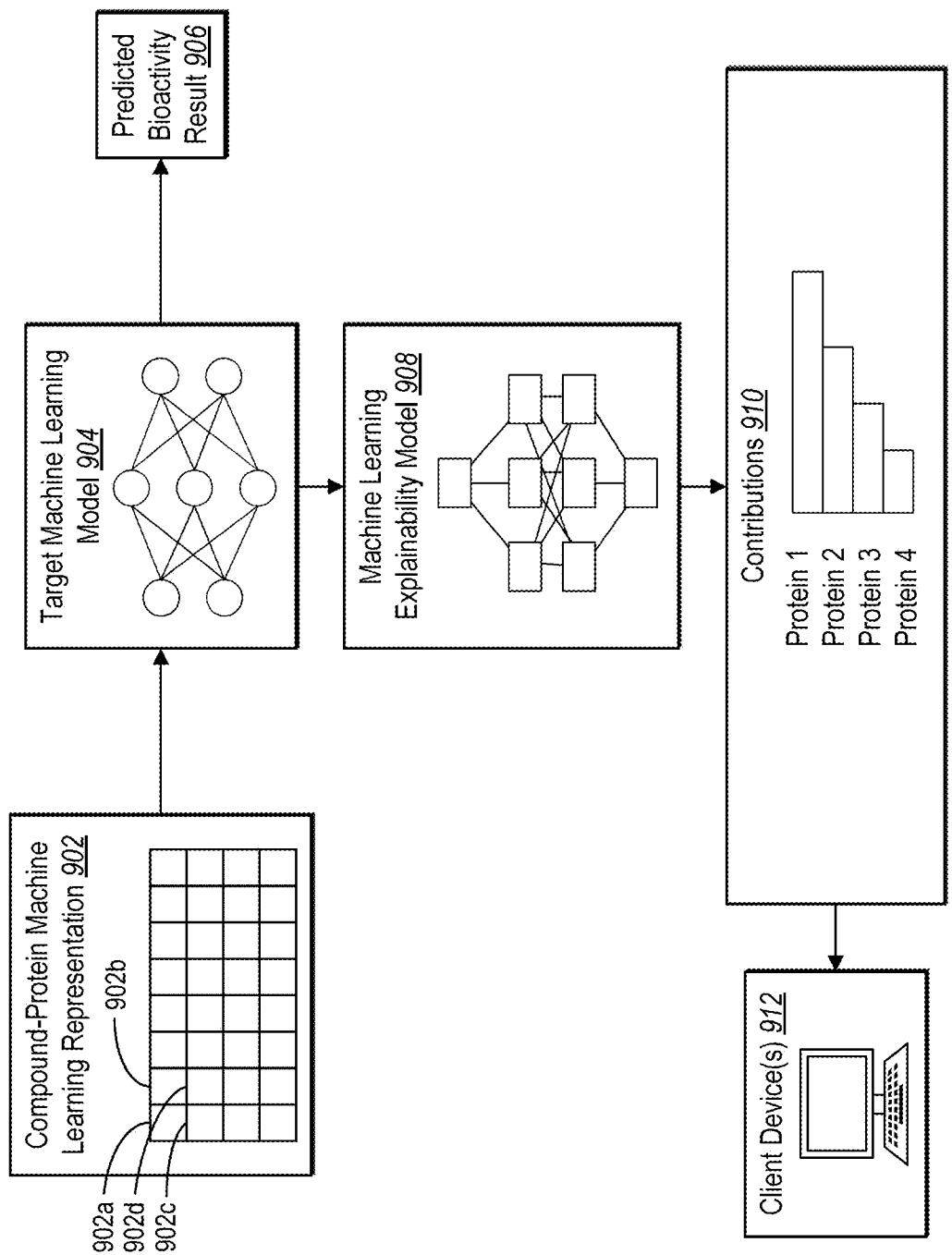
FIG. 9 illustrates generating contributions (e.g., for proteins) for a predicted target result from a target machine learning model utilizing a machine learning explainability model in accordance with one or more embodiments.

Specifically, FIG. 9 illustrates the protein interaction learning system 106 generating a compound-protein machine learning representation 902 (e.g., as described above in relation to FIGS. 2, 3, and 4). The protein interaction learning system 106 utilizes the target machine learning model 904 to generate a predicted bioactivity result 906 (e.g., as described above in relation to FIGS. 2 and 5). The protein interaction learning system 106 then utilizes the machine learning explainability model 908 to generate contributions 910.

For example, the machine learning explainability model 908 can generate the contributions 910 by perturbing one or more input features and analyzing how the perturbations impact the predicted bioactivity result 906. To illustrate, the protein interaction learning system 106 can analyze a first datapoint comprising a first feature to generate a first predicted bioactivity result. The protein interaction learning system 106 can then analyze a second datapoint comprising a second feature to generate a second predicted bioactivity result. The protein interaction learning system 106 can utilize the machine learning explainability model 908 to determine a contribution by comparing the different results from the different perturbed features of the different datapoints.

The protein interaction learning system 106 can perturb the input features in a variety of ways. For example, in addition to extracting different datapoints that have different features, the protein interaction learning system 106 can perturb input features by modifying the input features or combining the input features. For instance, the protein interaction learning system 106 can sample an empirical distribution of feature values and average over multiple samples.

Thus, in one or more implementations, the protein interaction learning system 106 perturbs or modifies match scores and analyzes different predicted results to determine the contributions 910. To illustrate, FIG. 9 shows a first match score 902a indicating a first binding likelihood for a first compound and a first pocket of a first protein. Similarly, FIG. 9 shows a second match score 902b indicating a second binding likelihood for the first compound and a second pocket of a second protein. Moreover, FIG. 9 illustrates a third match score 902c indicating a third binding likelihood for a second compound and the first pocket of the first protein. In addition, FIG. 9 shows a fourth match score 902d indicating a fourth binding likelihood for the second compound and the second pocket of the second protein.

The protein interaction learning system 106 can generate a first predicted target result for the first compound by analyzing the first match score and the second match score (and other match scores for the first compound). Similarly, the protein interaction learning system 106 can generate a second predicted target result for the second compound by analyzing the third match score and the fourth match score (and other match scores for the first compound).

In one or more implementations, the protein interaction learning system 106 perturbs the match scores to determine a contribution of the compounds and/or proteins at issue. For example, the protein interaction learning system 106 can perturb (e.g., remove or revise) the first match score and/or the third match score to determine a contribution of the first protein. To illustrate, the protein interaction learning system 106 can perturb the first match score, generate a perturbed predicted target result, and compare the perturbed predicted target result with the initial predicted target result to determine a measure of contribution. In some implementations, the protein interaction learning system 106 removes all match scores for a particular protein in determining the contribution of that protein.

Similarly, the protein interaction learning system 106 can perturb the second match score and/or the fourth match score to determine a contribution of the second protein. For instance, the protein interaction learning system 106 can perturb the second match score, generate a perturbed predicted target result, and compare the perturbed predicted target result with the initial predicted target result to determine a measure of contribution.

As shown, the protein interaction learning system 106 can also provide the contributions 910 for display via one or more client device(s) 912. In particular, the protein interaction learning system 106 can provide the predicted bioactivity result 906 and/or the contributions 910 for display to provide efficient, unique insights into the protein contributions leading to predicted target results. For instance, the protein interaction learning system 106 provides, for display to a client device, a first marginal contribution of a first protein and a second marginal contribution of a second protein. This results in significant reductions in time, user interactions, and computing resources for implementing computing devices.

For example, FIGS. 10A-10D illustrate providing example protein contributions for different ADMET predictions in accordance with one or more embodiments. FIGS. 10A-10D also illustrate experimental results indicating accuracy metrics utilizing different features for a target machine learning model in generating the ADMET predictions.

In relation to FIGS. 10A-10D experimenters generated six additional feature sets to test relative to one or more compound-protein machine learning representations discussed herein. Specifically, experimenters utilized the following compound fingerprints to train machine learning models:

Atom pair: Atom pair fingerprints as described by Carhart et al. JCICS 25:64-73 (1985). An atom pair substructure is defined as a triplet of two (non-hydrogen) atoms and their shortest path distance in the molecular graph.

Layered: Substructure fingerprint if appropriate layers are used (An alternate subgraph-hashing scheme)

Pattern: A topological fingerprint optimized for substructure screening

Daylight2048: Topological or path-based fingerprints are represented by Daylight fingerprints, which usually consist of 512, 1024, or 2048 bits. The Daylight fingerprint encodes for every connectivity pathway within a molecule up to a given length.

Morgan2: The Morgan algorithm, also known as Extended-Connectivity Fingerprints (ECFP), represents the molecular structure of a chemical compound. It focuses on molecular topology by capturing local chemical environment of atoms in the molecule.

MM input: Combination of various fingerprints (from the above fingerprints) and other chemical summary information of each molecule. In one or more implementations, this feature combination is utilized in training a compound-protein interaction machine learning model (e.g., the compound-protein interaction machine learning model 208).

Figure 10A:
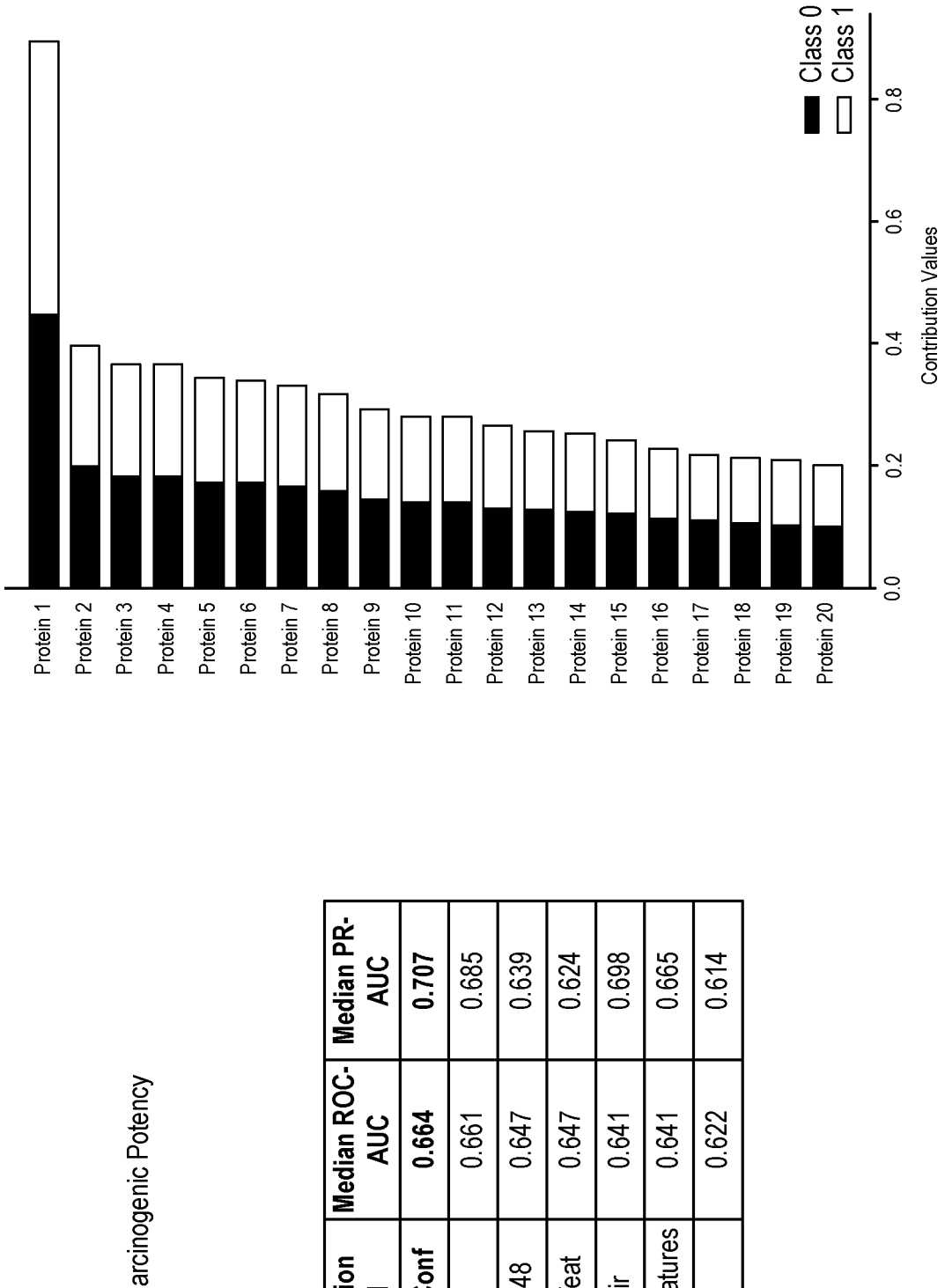
FIGS. 10A-10D illustrate example protein contributions for different ADMET predictions and corresponding accuracy metrics utilizing in accordance with one or more embodiments.
Figure 10B:
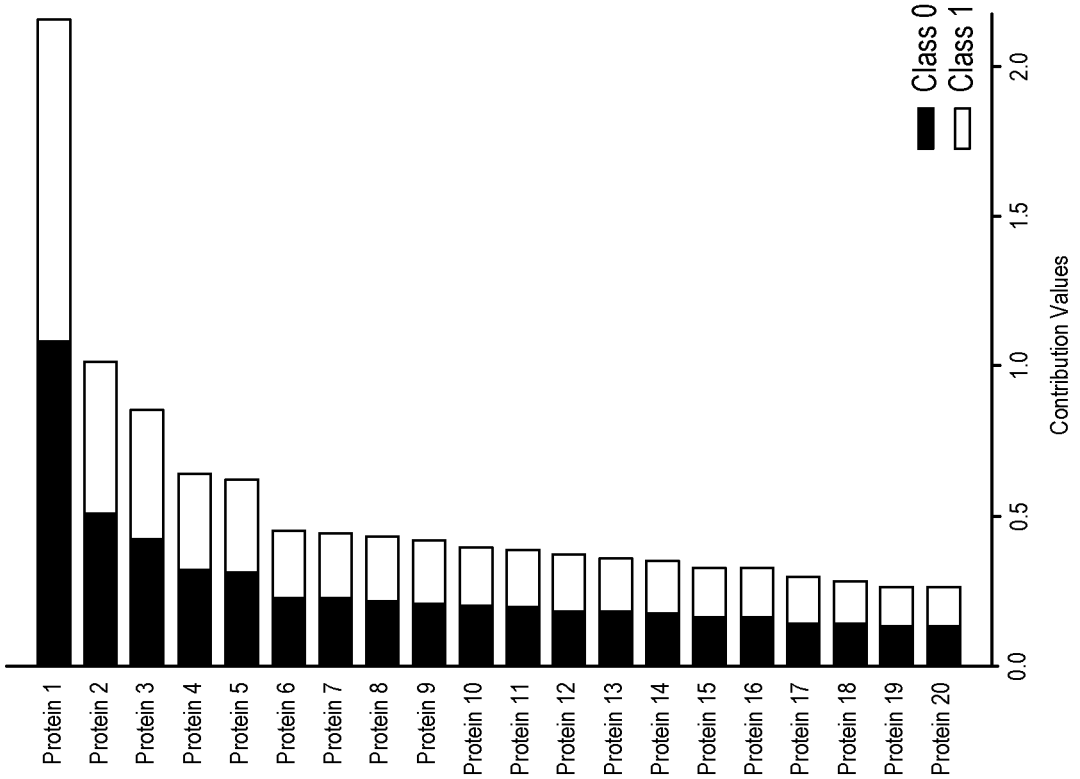
Figure 10C:
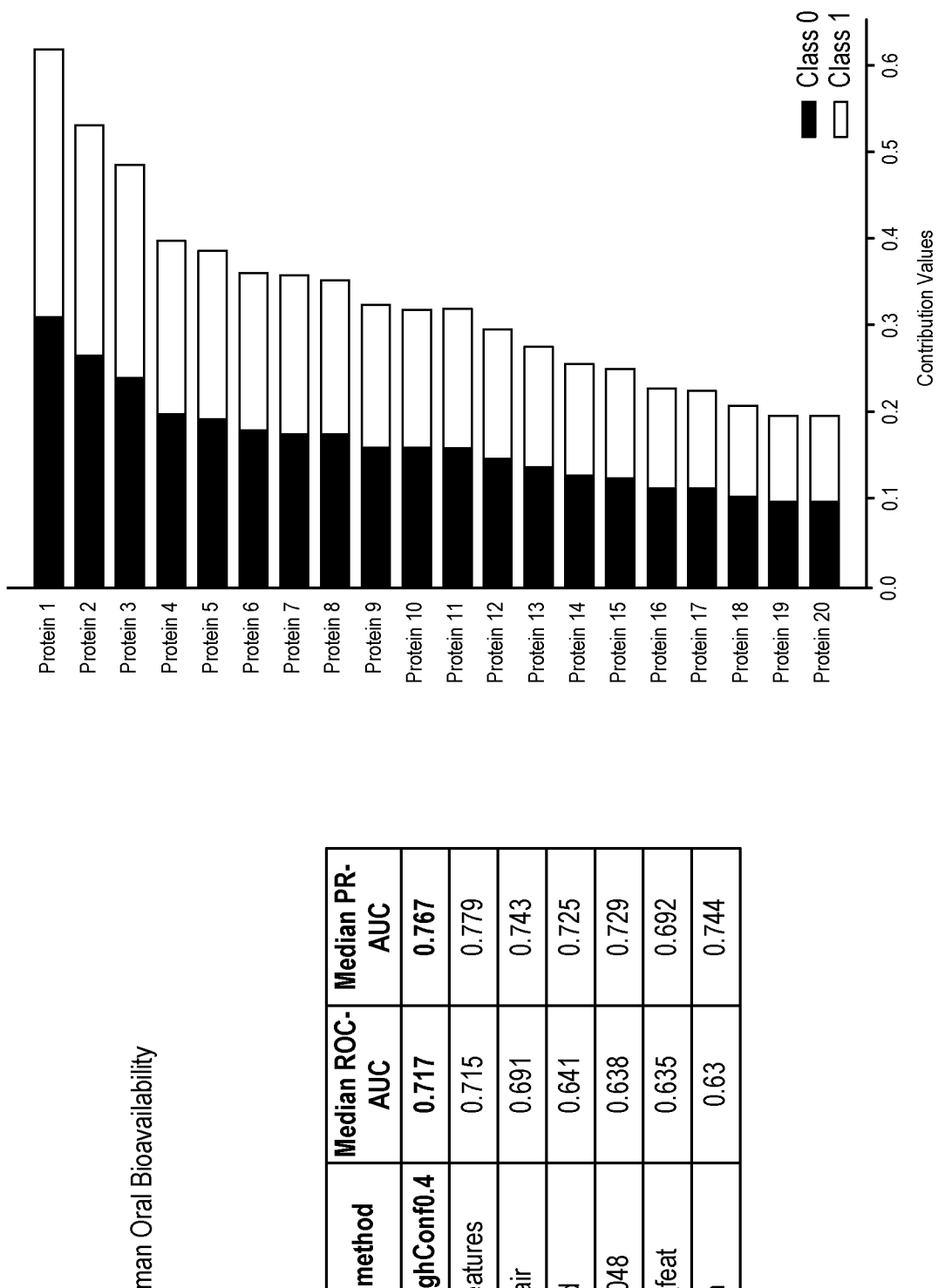
Figure 10D:
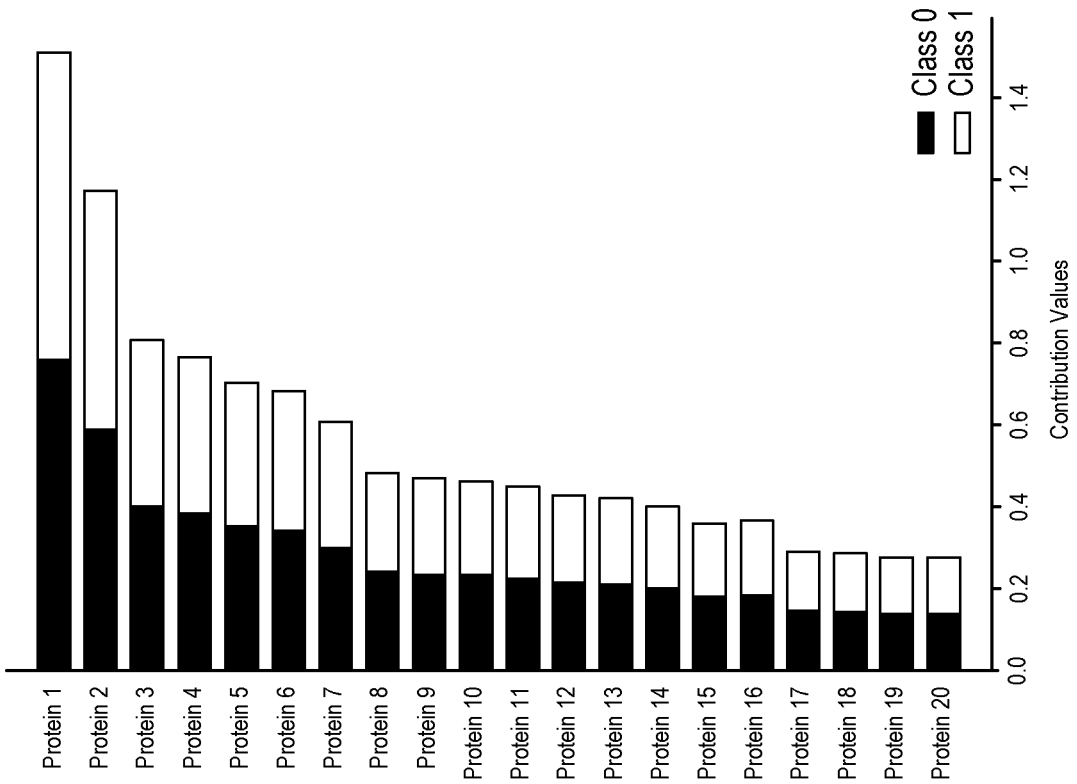

Researchers trained target machine learning models utilizing an experimental embodiment of the protein interaction learning system 106 for four different ADMET predictions: carcinogenic potency (illustrated in FIG. 10A), blood brain barrier (illustrated in FIG. 10B) human oral bioavailability (illustrated in FIG. 10C), human intestinal absorption (illustrated in FIG. 10D). Researchers then tested the trained target machine learning models and applied an explainability model to determine the proteins having the most significant contributions. Researchers also compared the trained target machine learning models to other machine learning models trained utilizing the other features discussed above (i.e., Atom pair, Layered, etc.).

As shown in FIGS. 10A-10D, the protein interaction learning system 106 generates more accurate results relative to other input feature combinations across different ADMET predictions. Indeed, as shown, the protein interaction learning system 106 outperforms these other approaches for both ROC-AUC and PR-AUC in most circumstances.

Furthermore, as illustrated in FIGS. 10A-10D, the protein interaction learning system 106 can provide unique insights into the contributing proteins (e.g., for each machine learning model and/or for each prediction). Unlike the other tested feature sets (i.e., Atom pair, Layered, etc.), the experimental embodiment of the protein interaction learning system 106 of FIGS. 10A-10D analyzes a compound-protein machine learning representation utilizing a machine learning explainability model to gain insights into the contribution proteins from within the protein feature space. Thus, for each target machine learning model generated by the protein interaction learning system 106, the protein interaction learning system 106 identifies the particular proteins and their contribution values. As shown, the protein interaction learning system 106 can generate contribution values for different classes (e.g., positive predictions and negative predictions).

Thus, in relation to FIG. 10C for instance, the protein interaction learning system 106 determines a contribution value for positive predictions (e.g., positive human oral bioavailability classifications) and a contribution for negative predictions (e.g., negative human oral bioavailability classifications) generated by the target machine learning model. These contribution values can then be utilized for additional downstream tasks (e.g., determining additional compounds that interact with that particular protein, targeting additional genes that impact the particular protein, or identifying compounds related to the additional genes).

Although not illustrated, the protein interaction learning system 106 can also determine contribution values for any particular prediction. Thus, although FIG. 10C illustrates proteins and contribution values for human oral bioavailability across predictions of a target machine learning model, the protein interaction learning system 106 can also generate proteins and contribution values for particular predictions of particular compounds (e.g., determine a first set of proteins and contribution values for a predicted target result for compound 1 and a second set of proteins and contribution values for a predicted target result for compound 2).

As mentioned previously, in one or more embodiments, protein interaction learning system 106 utilizes a protein confidence filter to select features for target machine learning models. Moreover, in some embodiments, the protein interaction learning system 106 compares similarity measures (from phenomic image embeddings) in selecting features for target machine learning models. In particular, in training a target machine learning model for generating predicted impact results for compounds in relation to a target gene, the protein interaction learning system 106 can utilize a pheno-similarity filter to focus on datapoints that are phenotypically similar to the target gene. For example, FIG. 11 illustrates the protein interaction learning system 106 utilizing a pheno-similarity filter and/or a protein confidence filter to select features for generating a training dataset for a target machine learning model in accordance with one or more embodiments.

Figure 11:
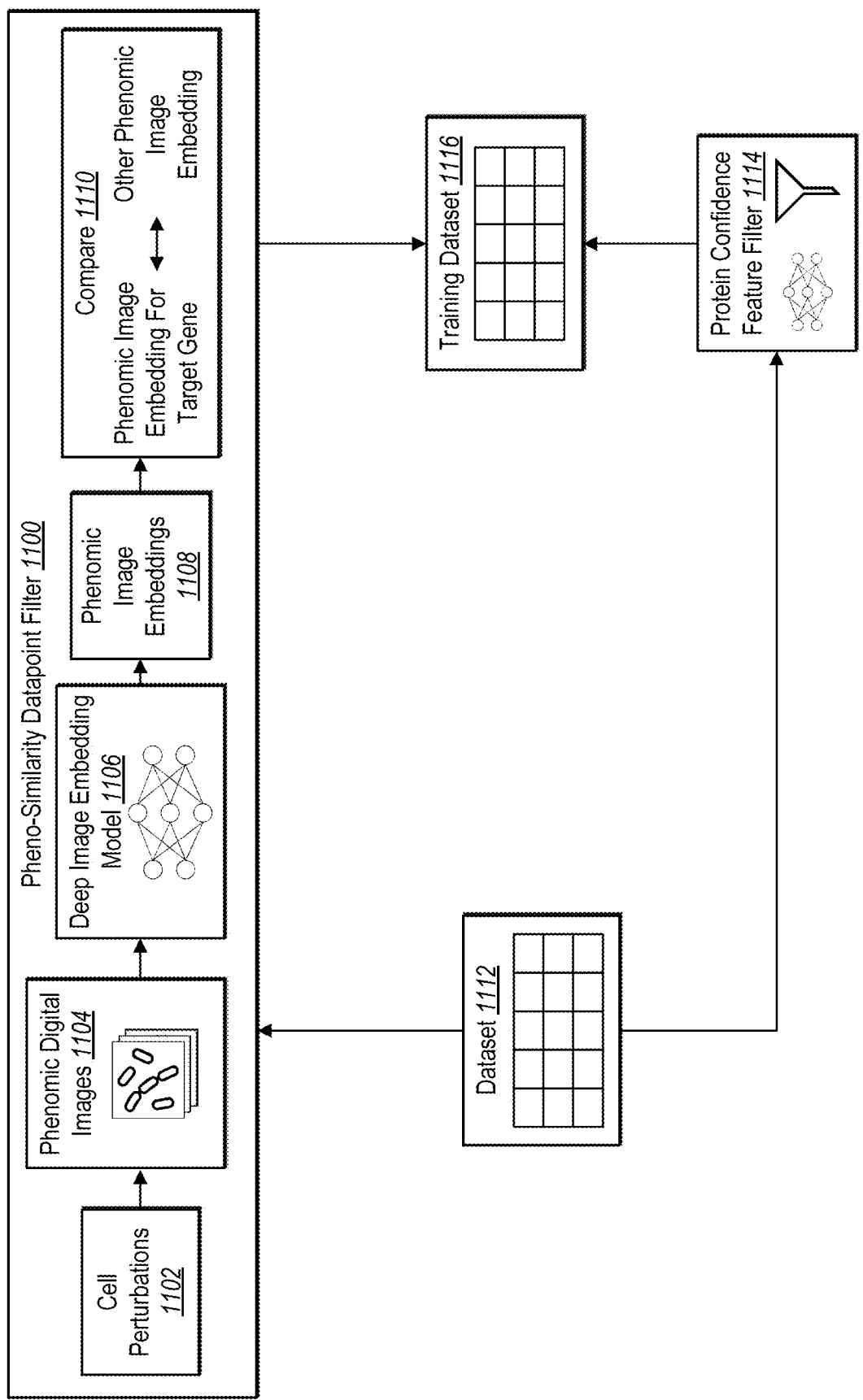
FIG. 11 illustrates utilizing a pheno-similarity filter and/or a protein confidence filter to select features for generating a training dataset for a target machine learning model in accordance with one or more embodiments.

Specifically, FIG. 11 illustrates applying a pheno-similarity filter 1100 and/or a protein confidence feature filter 1114 to a dataset 1112 to generate a training dataset 1116. The dataset 1112 comprises a plurality of datapoints (and/or corresponding features) for training a target machine learning model. Thus, for example, the dataset can include compound-protein machine learning representations, compound feature, protein features, biological perturbation program features, or other datapoints/features discussed herein. In some implementations, the dataset 1112 comprises datapoints and features for historical compounds analyzed by biological perturbation program(s) corresponding to target gene(s).

As illustrated, the protein interaction learning system 106 utilizes the pheno-similarity filter 1100 to generate the training dataset 1116. Specifically, the protein interaction learning system 106 compares phenomic image embeddings for a target gene corresponding to a biological perturbation program with phenomic image embeddings for other genes and/or compounds. The protein interaction learning system 106 removes or filters datapoints from the dataset 1112 utilizing the pheno-similarity filter 1100.

To illustrate, the protein interaction learning system 106 performs cell perturbations 1102. As used herein, the term cell perturbation refers to a modification or change to a cell (e.g., as part of an assay/experiment). In particular, a cell perturbation includes introducing a compound or solute to a cell to modify cell development. Similarly, a cell perturbation includes modifying a gene or protein in the cell to modify cell development. To illustrate, the protein interaction learning system 106 performs perturbation experiments by developing cells (e.g., stem cells) upon applying various perturbations. Thus, the protein interaction learning system 106 can apply one or more compounds in developing a stem cell. Similarly, the protein interaction learning system 106 can perform a gene knockout perturbation (e.g., CRISPR knockout) on a cell. Thus, the protein interaction learning system 106 can perform compound perturbations and/or gene perturbations for the cell perturbations 1102.

As further illustrated in FIG. 11, the protein interaction learning system 106 captures phenomic digital images 1104. As used herein, the term phenomic digital images refers to a digital image of a cell (e.g., a cell phenotype). In particular, a phenomic digital image includes an image of a cell phenotype resulting from one or more perturbations. For example, upon developing the cells with the cell perturbations 1102, the protein interaction learning system 106 utilizes a camera device to capture a digital image of the resulting cell phenotypes. These phenotypes reflect altered biological characteristics within the cell due to the cell perturbations 1102. Thus, the phenomic digital images 1104 provide a visual representation of phenotypes resulting from the cell perturbations 1102.

Upon capturing the phenomic digital images 1104, the protein interaction learning system 106 utilizes a deep image embedding model 1106 to generate phenomic image embeddings 1108. As used herein, a deep image embedding model refers to a computer-implemented model that generates embeddings from digital images (e.g., phenomic digital images). In particular, a deep image embedding model includes a neural network (e.g., a convolutional neural network) or other embedding model that generates a vector representation of an input digital image.

In some implementations, the protein interaction learning system 106 trains the deep image embedding model 1106 through supervised learning (e.g., to predict perturbations from digital images). For instance, the protein interaction learning system 106 trains the deep image embedding model 1106 to generate predicted perturbations from phenomic digital images. For instance, protein interaction learning system 106 utilizes neural network layers to generate vector representations of the phenomic digital images at different levels of abstraction and then utilizes output layers to generate predicted perturbations. The protein interaction learning system 106 then trans the deep image embedding model 1106 by comparing the predicted perturbations with ground truth perturbations. Although the foregoing example describes a particular training approach and embedding model, the protein interaction learning system 106 can utilize a variety of image embedding models, such as a CLIP embedding model.

With regard to FIG. 11, the protein interaction learning system 106 utilizes the deep image embedding model to generate embeddings (e.g., feature/vector representations) of new phenomic digital images. For instance, the protein interaction learning system 106 utilizes the internal neural network layers to generate embeddings (rather than generate perturbation predictions). The protein interaction learning system 106 then utilizes the embeddings as representations of the phenomic digital images.

Indeed, as shown in FIG. 11, the protein interaction learning system 106 utilizes the deep image embedding model 1106 to generate phenomic image embeddings 1108. Thus, the phenomic image embeddings 1108 includes numerical representations (e.g., feature vector representations) of the phenomic digital images 1104. Because the deep image embedding model 1106 is trained to map digital image differences to an embedding space, the protein interaction learning system 106 can utilizes the embeddings to reflect differences between phenotypes resulting from different perturbations.

As shown, the protein interaction learning system 106 can apply the pheno-similarity filter 1100 by performing an act 1110 of comparing phenomic images embeddings. For example, the protein interaction learning system 106 can generate (or access) a phenomic image embedding for a target gene (e.g., a phenomic image embedding from a phenomic digital image portraying a cell after a CRISPR knockout of the target gene). The protein interaction learning system 106 can also generate a phenomic image embedding of other genes or compounds (e.g., embeddings reflecting phenotypes from perturbations corresponding to the other genes or compounds). The protein interaction learning system 106 can compare the phenomic image embedding for the target gene with other phenomic image embeddings of other genes or compounds.

Specifically, in one or more embodiments, the protein interaction learning system 106 compares phenomic image embeddings to determine a measure of similarity. As used herein, a measure of similarity refers to a value or metric indicating a likeness or relationship. For instance, a measure of similarity can indicate a metric of likeness between two embeddings. To illustrate, the protein interaction learning system 106 can generate a measure of similarity by determining a cosine similarity between two phenomic image embeddings or a Euclidian distance (e.g., in feature space) between two phenomic image embeddings (e.g., between two feature vectors).

As shown, the protein interaction learning system 106 can filter the dataset 1112 based on measures of similarity between a target gene and other genes or compounds. For instance, the protein interaction learning system 106 can identify other genes (e.g., other genes and proteins that result from transcribing the other genes). The protein interaction learning system 106 can compare the phenomic image embedding for a target gene with phenomic image embeddings for the other genes (e.g., genes related to particular transcribed proteins). If the measure of similarity fails to satisfy a threshold, the protein interaction learning system 106 can remove corresponding datapoints (e.g., datapoints corresponding to the genes and/or proteins) from the dataset 1112. If the measure of similarity satisfies the threshold, the protein interaction learning system 106 can include the corresponding datapoints in the training dataset 1116.

Similarly, the protein interaction learning system 106 can determine measures of similarity between a phenomic image embedding for a target gene and phenomic image embeddings for compounds. If the phenomic image embeddings for a compound fails to satisfy a similarity threshold, the protein interaction learning system 106 can exclude the corresponding datapoints from the training dataset 1116. If the phenomic image embeddings for a compound satisfies a similarity threshold, the protein interaction learning system 106 can add the corresponding datapoints to the training dataset 1116. Thus, the protein interaction learning system 106 can generating a training dataset by filtering datapoints based on a measure of similarity of phenomic image embeddings relative to the target gene.

As shown, the protein interaction learning system 106 can also utilize the protein confidence feature filter 1114. As described in FIG. 4 (e.g., with regard to protein confidence filter 402), the protein interaction learning system 106 can apply the protein confidence feature filter 1114 by applying a confidence machine learning model 404 to generate protein confidence scores 406. The protein interaction learning system 106 then removes features (e.g., from a compound-protein machine learning representation) that fail to satisfy a protein confidence threshold.

By applying the pheno-similarity filter 1100 and/or the protein confidence feature filter 1114, the protein interaction learning system 106 can generate more accurate training data that ultimately improves the accuracy of target machine learning models. For example, by training a target machine learning model utilizes the training dataset 1116 (that includes pheno-similar data points relative to a target gene), the protein interaction learning system 106 can train the target machine learning model to more accurately generate impact predictions. Moreover, by removing features utilizing the protein confidence feature filter 1114, the protein interaction learning system 106 can reduce the dimensionality of the training dataset, improve efficiency, and reduce needed computer resources.

Figure 12:
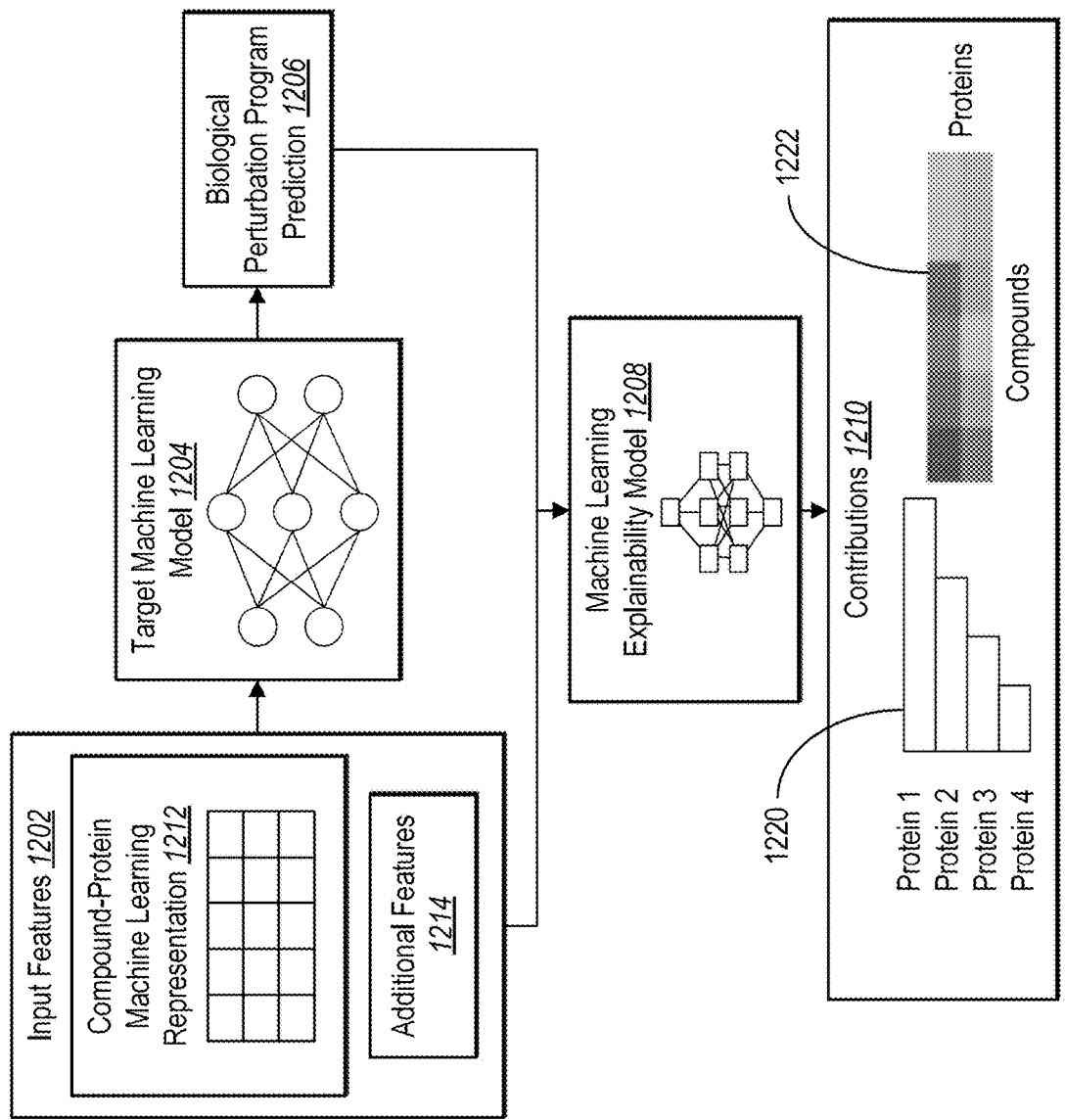
FIG. 12 illustrates utilizing a machine learning explainability model to generate contributions from a target machine learning model generating biological perturbation program predictions for a biological activity of biological perturbation program in accordance with one or more embodiments.

As mentioned above, the protein interaction learning system 106 can utilize a machine learning explainability model to determine contributions for predicted target results. FIG. 12 illustrates, the protein interaction learning system 106 utilizing a machine learning explainability model 1208 to generate contributions 1210 from a target machine learning model 1204 generating gene impact predictions 1206 in accordance with one or more embodiments.

To illustrate, the protein interaction learning system 106 can identify one or more query compounds for a biological perturbation program. As used herein, the term query compound refers to a compound that is included as part of a request or query. For instance, a query compound includes a compound utilized for generating a predicted target result. Thus, for example, in relation to FIG. 12, query compound(s) can include a compound that a client device queries for a prediction as to whether the compound will have a predicted impact within a particular (e.g., target) biological perturbation program. To illustrate, a client device can submit a query as to whether a compound will be filtered out (or be selected) at the conclusion of a biological perturbation program (e.g., whether the compound impacts a target gene that is the focus of the biological perturbation program). As mentioned above, the protein interaction learning system 106 can provide a graphical user interface on the client device that includes elements for selecting query compounds and a target gene (and/or a target compound-gene program corresponding to a target gene).

Thus, for example, based on user interaction with user interface elements (or based on a computer algorithm for selecting potential compounds), the protein interaction learning system 106 can identify a compound to test and analyze (i.e., to see if it will have an impact corresponding to a particular target gene that is the subject of the biological perturbation program). The protein interaction learning system 106 can extract biological perturbation program features 1202, including a compound-protein machine learning representation 1212 for the query compound and additional features 1214 (e.g., corresponding to the target gene or other features described herein). The protein interaction learning system 106 analyzes these features to generate the biological perturbation program prediction 1206 (i.e., a prediction as to whether the compound will be identified as a hit upon completion of the biological perturbation program or a prediction as to whether the compound will demonstrate a target biological activity).

As shown in FIG. 12, the protein interaction learning system 106 utilizes a machine learning explainability model 1208 to generate contributions 1210. The protein interaction learning system 106 can determine contributions for proteins in relation to the gene impact prediction. Thus, for example, as discussed above (e.g., in relation to FIG. 9) the protein interaction learning system 106 can generate a plurality of contribution values indicating different contributions of a set of proteins to a set of gene impact predictions or a particular gene impact prediction. In particular, the protein interaction learning system 106 can generate proteins and corresponding contribution values indicating the marginal contribution of the proteins to the biological perturbation program prediction 1206. To illustrate, the protein interaction learning system 106 can determine that for a particular biological perturbation program, the protein interaction learning system 106 has a largest contribution value of a first protein (e.g., the first protein is most significant in determining the outcome). The protein interaction learning system 106 can also determine contributions for a gene impact prediction for a particular compound (in addition to determining impact predictions for the biological perturbation program as a whole).

For example, the protein interaction learning system 106 can determine contributions for proteins and compounds with regard to impact predictions (e.g., biological perturbation program predictions). To illustrate, the protein interaction learning system 106 can determine an impact prediction for a protein in generating a particular impact prediction for a particular query compound. Thus, the protein interaction learning system 106 can generate a contribution for a particular compound-protein pair in relation to a predicted impact prediction. Indeed, as discussed in greater detail below (e.g., in relation to FIGS. 15-16), the protein interaction learning system 106 can generate a heatmap or table indicating contribution values for a plurality of proteins in relation to a particular query compound within a biological perturbation program. Thus, for example, the protein interaction learning system 106 can generate a heatmap that includes contribution values for protein-compound pairs relative to the biological perturbation program.

Indeed, as illustrated in FIG. 12, the protein interaction learning system 106 can generate the contributions 1210 in a variety of forms. FIG. 12 illustrates a first user interface element 1220 that portrays four proteins and contribution values in the form of a bar chart. The length of each bar in the bar chart reflects the contribution value for a corresponding protein. FIG. 12 also illustrates a second user interface element 1222 that portrays an explainability heatmap of contribution values for proteins corresponding to particular compounds (query compounds). The individual fields (i.e., squares) within the explainability heatmap correspond to contribution values of a corresponding protein compound pair. Thus, the protein interaction learning system 106 can provide, for display to a client device, an explainability heatmap illustrating a first marginal contribution in a first heatmap field corresponding to a first protein and a first compound and further illustrating a second marginal contribution in a second heatmap field corresponding to a second protein and a second compound. Indeed, in relation to the embodiment of FIG. 12, the columns of the explainability heatmap (of the second user interface element 1222) each correspond to a different compound and each row of the explainability heatmap each correspond to a contributing protein in relation to generating gene impact predictions utilizing a target machine learning model.

As discussed above, the protein interaction learning system 106 can utilize the machine learning explainability model 1208 (e.g., similar to the machine learning explainability model 218, 908) to generate the contributions 1210. For instance, the protein interaction learning system 106 perturbs the biological perturbation program features to determine different gene impact predictions 1206 resulting from the target machine learning model 1204. The protein interaction learning system 106 analyzes these perturbations and predictions to determine a contribution value of the various input features, such as proteins and/or compounds. In one or more embodiments, the protein interaction learning system 106 utilizes a SHAP model for the machine learning explainability model 1208 and Shapley values for the contribution values utilized to generate the contributions 1210.

Figure 13:
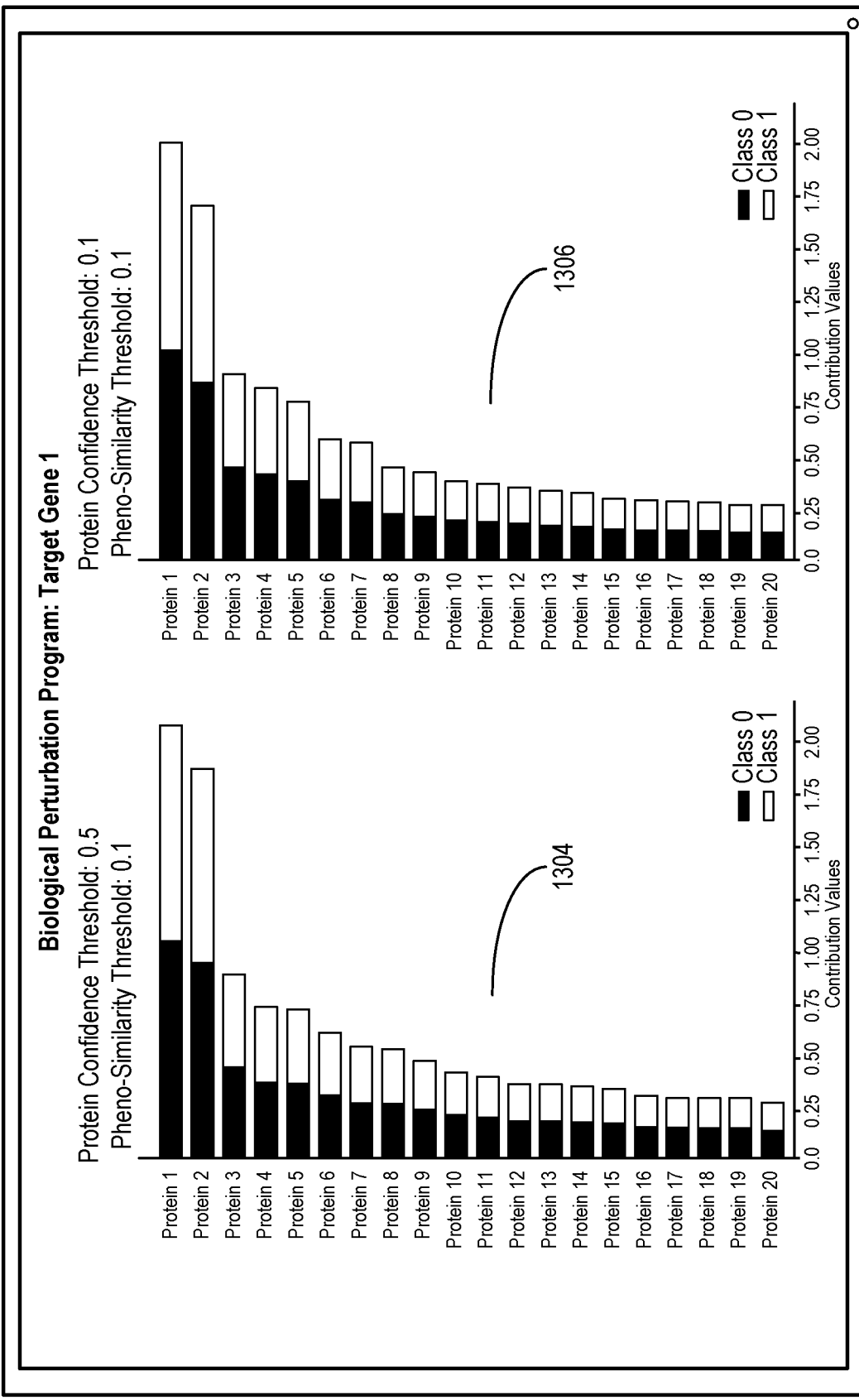
FIG. 13 illustrates generating contribution values for a plurality of proteins in relation to biological perturbation program predictions for a biological activity of a biological perturbation program in accordance with one or more embodiments.
Figure 14:
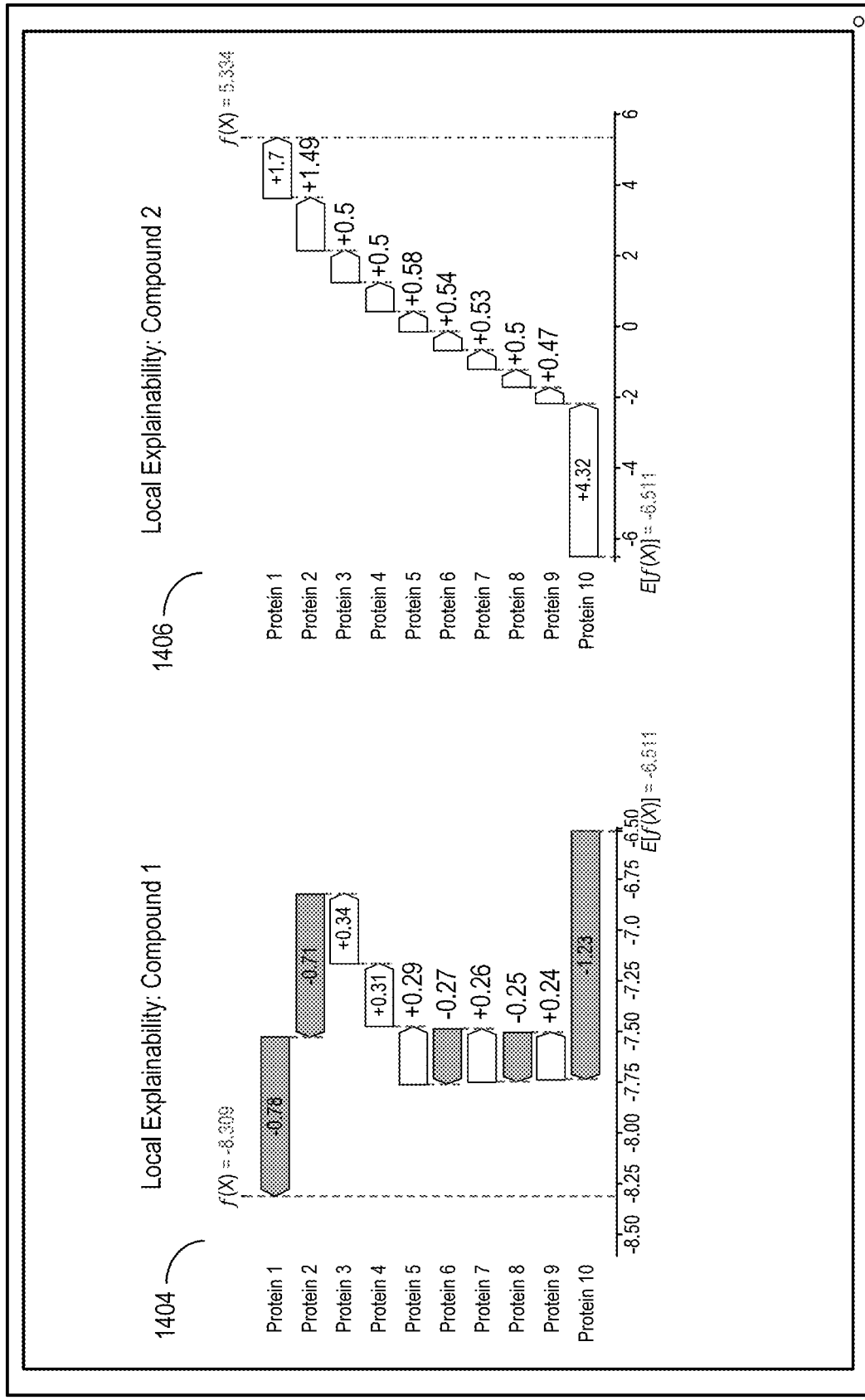
FIG. 14 illustrates generating contribution values for a plurality of proteins in relation to impact predictions for particular compounds in relation to a biological activity of biological perturbation program in accordance with one or more embodiments.

For example, FIGS. 13-14 illustrate the protein interaction learning system 106 example contributions for different biological perturbation programs in accordance with one or more embodiments. In particular, FIG. 13 illustrates the protein interaction learning system 106 providing multiple contribution values for different contributing proteins in relation to a target machine learning model for a biological perturbation program. FIG. 14 illustrates an additional illustration of the protein interaction learning system 106 providing example contribution values of proteins in relation to predictions for individual compounds of a target machine learning model.

As shown in FIG. 13, the protein interaction learning system 106 generates (and provides for display via a client device 1302) a first contribution element 1304 (illustrating a first set of proteins) and a second contribution element 1306 (illustrating a second set of proteins) and provides the first contribution element 1304 and the second contribution element 1306 for display via a user interface. The first contribution element 1304 and the second contribution element 1306 comprise proteins and corresponding contribution values for those proteins. The contribution values indicate the marginal contribution of each protein in predictions of a target machine learning model. Specifically, in relation to FIG. 13, the protein interaction learning system 106 trained a target machine learning model for a gene compound program corresponding to target gene 1. The protein interaction learning system 106 applied a machine learning explainability model to determine the marginal contributions of each selected protein to the overall predictions of the target machine learning model.

As mentioned above, the protein interaction learning system 106 can utilize different filters in training a target machine learning model, including a pheno-similarity filter and/or a protein confidence filter. In relation to FIG. 13, the protein interaction learning system 106 utilized a first set of filter values/thresholds in generating the first contribution element 1304 and a second set of filter values/thresholds in generating the second contribution element 1306. Specifically, the protein interaction learning system 106 utilized a protein confidence threshold of 0.5 (for filtering features as described in relation to FIGS. 4 and 9) and a pheno-similarity threshold of 0.1 (e.g., a measure of similarity, such as a cosine similarity discussed in relation to FIG. 11) for the first contribution element 1304. The protein interaction learning system 106 utilized a protein confidence threshold of 0.1 and a pheno-similarity threshold of 0.1 for the second contribution element 1306.

Thus, the protein interaction learning system 106 can train target machine learning models utilizing different thresholds and determine different contribution values for the resulting target machine learning models. Moreover, the protein interaction learning system 106 can dynamically adjust these thresholds. For instance, the protein interaction learning system 106 can provide user options (in various graphical user interfaces) to select protein confidence thresholds and/or pheno-similarity thresholds in generating target machine learning models.

Although FIG. 13 illustrates generating global proteins and contribution values for a target machine learning, FIG. 14 illustrates generating local proteins and contribution values (e.g., for specific impact predictions of individual compounds). In particular, FIG. 14 illustrates the protein interaction learning system 106 providing, for display, a user interface via a display screen of a computing device 1402. As shown, the user interface includes a first local explainability element 1404 for a first compound and a second local explainability element 1406 for a second compound. The first local explainability element 1404 includes a first set of proteins and corresponding contribution values indicating the marginal contribution of the proteins with regard to an impact prediction for the first compound. The second local explainability element 1406 includes a second set of proteins and corresponding contribution values indicating the marginal contribution of the proteins with regard to an impact prediction for the second compound.

In particular, the protein interaction learning system 106 trains a target machine learning model for a biological perturbation program corresponding to target gene 2. The protein interaction learning system 106 utilizes the target machine learning model to generate an impact prediction for the first compound in relation to target gene 2 and the biological perturbation program. The protein interaction learning system 106 utilizes a machine learning explainability model to generate the first local explainability element 1404 and the significance of the proteins in that local prediction for the first compound. The protein interaction learning system 106 similarly generates an impact prediction for the second compound and utilizes the machine learning explainability model to generate the second local explainability element 1406. Thus, the protein interaction learning system 106 can generate (and provide for display) user interface elements identifying proteins contributing to the predicted success or failure of a compound in impacting a target gene.

Figure 15:
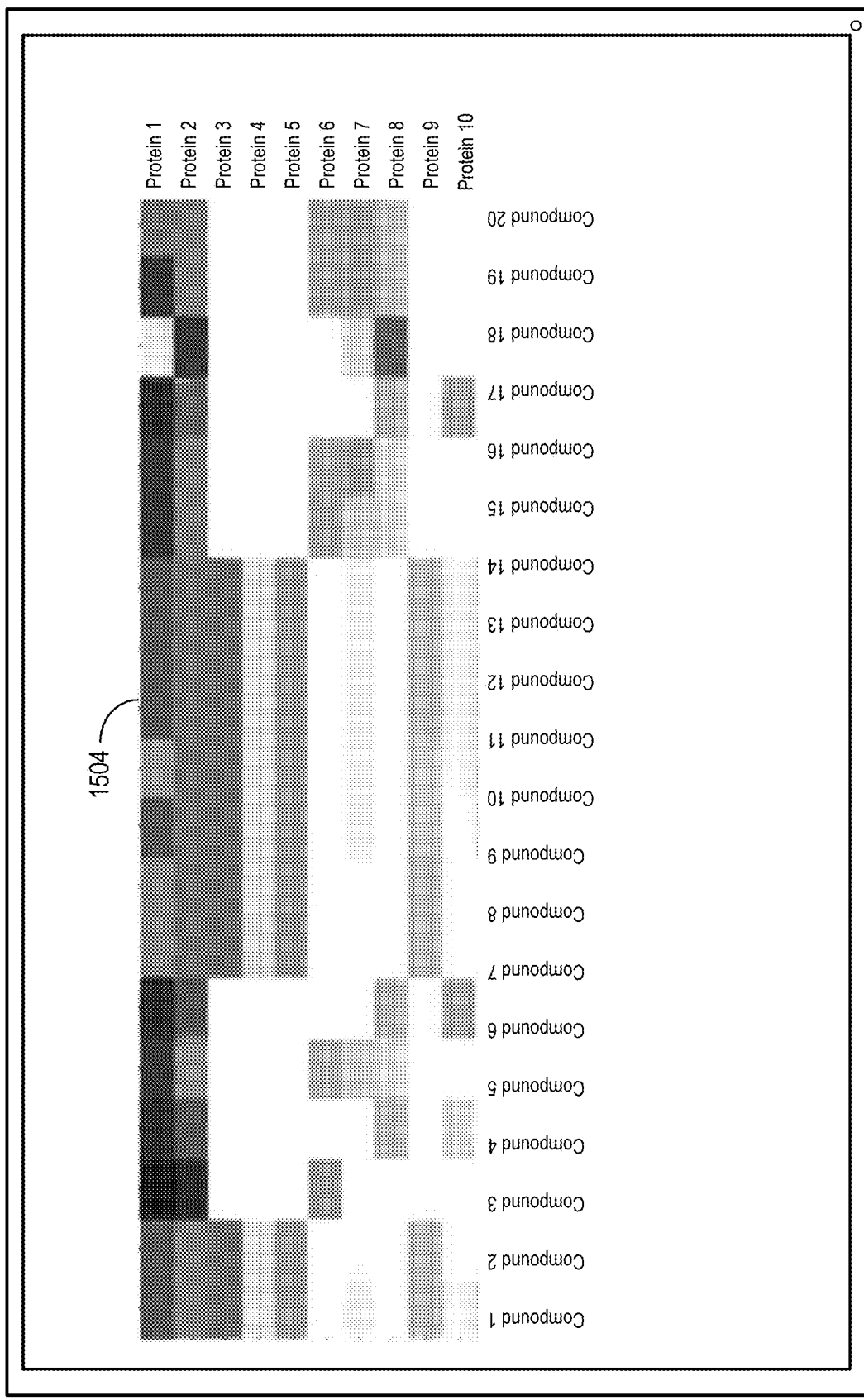
FIG. 15 illustrates a heatmap indicating contribution values for a plurality of query compounds and a plurality of proteins for a biological perturbation program in accordance with one or more embodiments.

As discussed above, in one or more implementations, the protein interaction learning system 106 also generates an explainability heatmap indicating the local contribution values for proteins in relation to individual compounds and corresponding predictions. For example, FIG. 15 illustrates the protein interaction learning system 106 providing an explainability heatmap 1504 for display on a client device 1502 in accordance with one or more embodiments.

Specifically, the protein interaction learning system 106 generates the explainability heatmap 1504 utilizing a target machine learning model trained to generate impact predictions for a biological perturbation program. The protein interaction learning system 106 generates local impact predictions for specific compounds and utilizes a machine learning explainability model to generate proteins and contribution values for the local predictions. The protein interaction learning system 106 generates the explainability heatmap 1504 by providing these contribution values (as colors or shades) in fields corresponding to the particular compounds and proteins for each contribution value. For instance, the explainability heatmap 1504 has rows for different compounds, columns for different proteins, and fields reflecting the corresponding contribution values for impact predictions of a target machine learning model. Thus, the explainability heatmap 1504 provides an efficient way to analyze the importance or contribution of proteins in the positive or negative impact that individual compounds have on a particular target gene. This provides an accurate and efficient tool for determining the underlying protein biology driving the impact of compounds on target genes.

For example, the protein interaction learning system 106 can utilize the local explainability values in the explainability heatmap 1504 to perform further analysis and determine additional relationships and insights. To illustrate, the protein interaction learning system 106 can apply clustering models to determine similarities between compounds and identify the driving proteins/genes for the similar compound clusters. For instance, FIG. 16 illustrates identifying compound clusters and target proteins/genes for the compound clusters in accordance with one or more embodiments.

Figure 16:
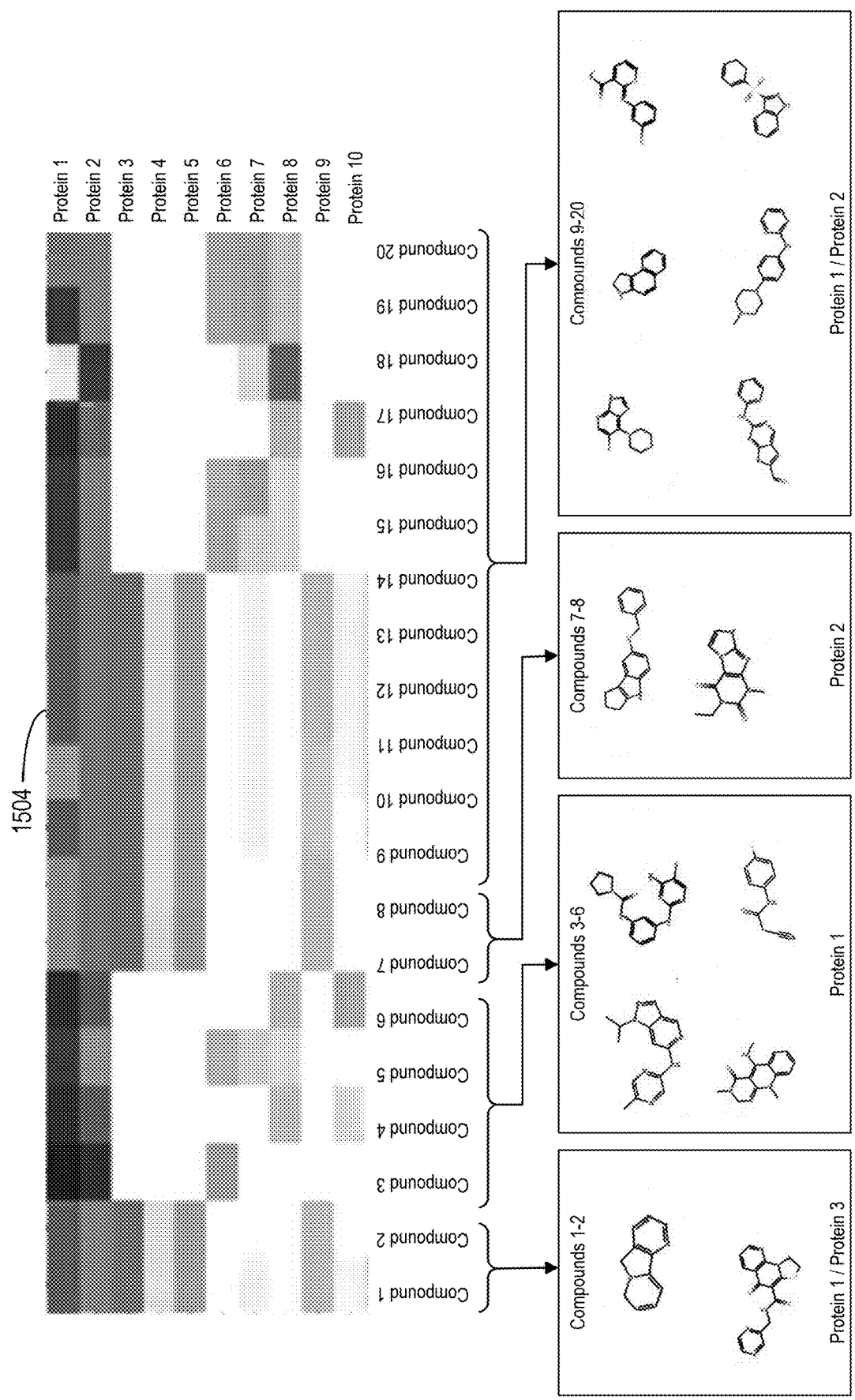
FIG. 16 illustrates identifying compound clusters and target proteins/genes for the compound clusters in accordance with one or more embodiments.

As illustrated in FIG. 16, the protein interaction learning system 106 can identify clusters of compound from the explainability heatmap 1504. In particular, the protein interaction learning system 106 applies a clustering algorithm to the contribution values and identifies compound clusters. These compound clusters thus reflect compounds where the contribution values indicate that similar proteins drive the underlying biological processes in impacting target genes.

For example, in relation to FIG. 16, compounds 1-2 belong to the same cluster that have a strong contribution values in relation to proteins 1-2 (and similar contribution patterns). Thus, the protein interaction learning system 106 can identify proteins 1 and 2 as potentially significant with regard to target compounds 1 and 2. In one or more embodiments, the protein interaction learning system 106 also identifies genes corresponding to proteins (e.g., genes in the proteins). Thus, where proteins are referred to herein, the protein interaction learning system 106 can also display or identify corresponding genes. Accordingly, if gene 1 and 2 (corresponding to protein 1 and protein 2) are of interest, the protein interaction learning system 106 can identify compounds 1 and compound 2 as potential compounds of interest.

Similarly, the protein interaction learning system 106 also determines that compounds 3-6 (in a second cluster) are strongly correlated to protein 1 (and a corresponding gene 1). Thus, the protein interaction learning system 106 can identify the second cluster of compounds for additional consideration in relation to gene 1. Thus, the protein interaction learning system 106 can determine inter-relationships between compounds and genes/proteins by comparing contribution values from an explainability heatmap resulting from compound-protein machine learning representations.

Figure 17:
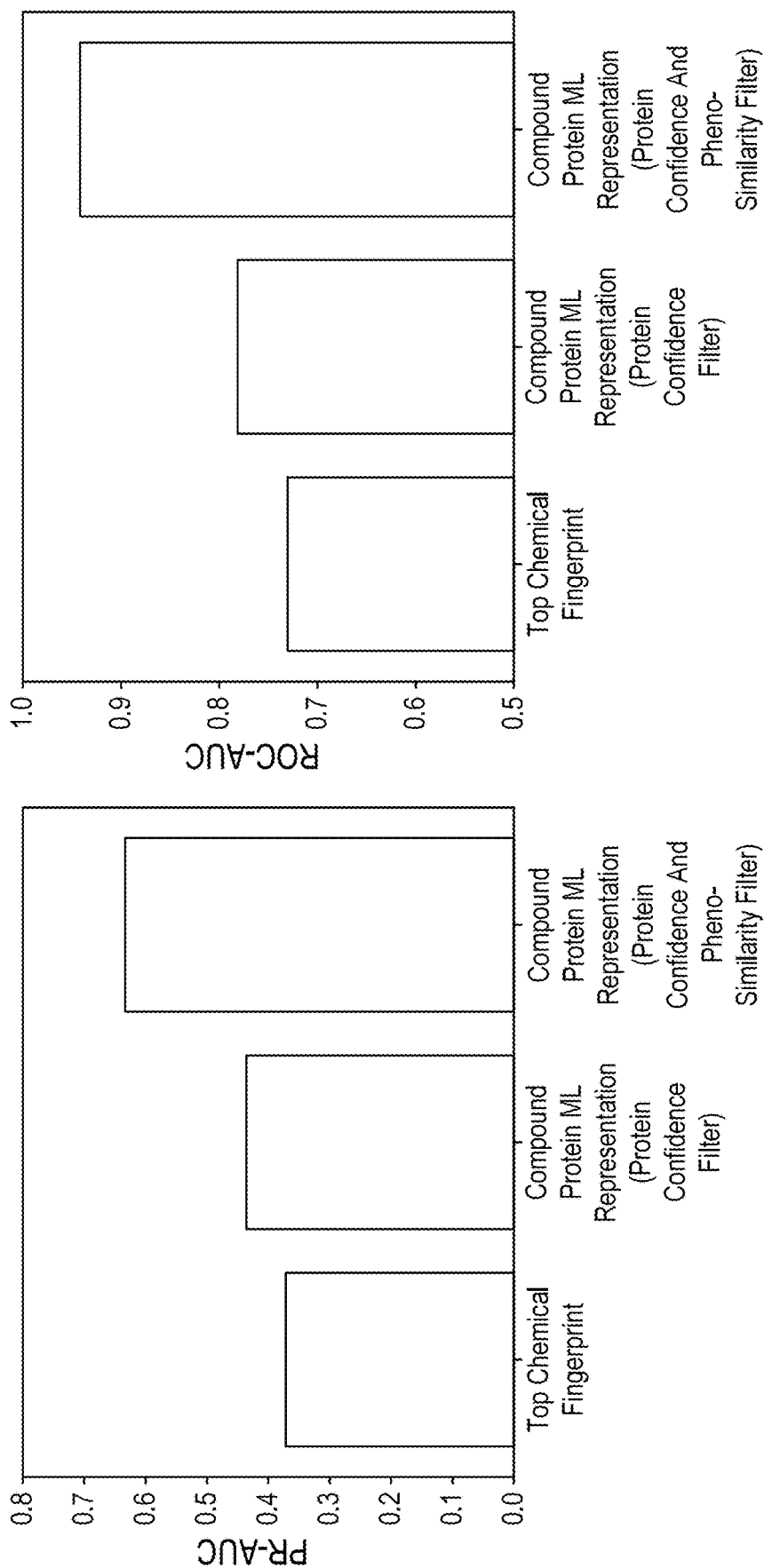
FIG. 17 illustrates experimental performance results from utilizing compound-protein machine learning representations to train target machine learning models in accordance with one or more embodiments.

As mentioned previously, by utilizing compound-protein machine learning representations to train and implement target machine learning models, the protein interaction learning system 106 can significantly improve performance. For example, FIG. 17 illustrates experimental performance results from using different features to train and implement a machine learning model. Specifically, FIG. 17 illustrates PR-AUC for three machine learning models trained based on different features. As shown, researchers trained a first machine learning model without compound-protein machine learning representations (e.g., utilizing the top performing chemical fingerprint, Layered features, introduced above). The protein interaction learning system 106 trained a second machine learning model utilizing compound-protein machine learning representations (and a protein confidence filter, as discussed above). The protein interaction learning system 106 trained a third machine learning model utilizing compound-protein machine learning representations (with a protein confidence filter and pheno-similarity filter as discussed above). As shown, utilizing compound-protein machine learning representations can provide significant improvement relative to other signals in training a target machine learning model. Moreover, utilizing pheno-similar genes to filter the corresponding datapoints can help in achieving higher performance models.

In addition, FIG. 18 illustrates experimental performance results of target machine learning models generating impact predictions for different biological perturbation programs in accordance with one or more embodiments. Specifically, FIG. 18 illustrates performance of target machine learning models trained for seven different biological perturbation programs corresponding to seven target genes. On the left side, FIG. 18 illustrates ROC-AUC and PR-AUC values resulting from experimental embodiments of the protein interaction learning system 106 (i.e., the "Chemoproteomic Strategy"). On the right side, FIG. 18 illustrates ROC-AUC and PR-AUC for other chemical fingerprints described above. As shown, the protein interaction learning system 106 outperforms other chemical fingerprints in the vast majority of circumstances.

FIGS. 1-18, the corresponding text, and the examples provide a number of different systems, methods, and non-transitory computer readable media for generating a machine learning dataset response. In addition to the foregoing, embodiments can also be described in terms of flowcharts comprising acts for accomplishing a particular result. For example, FIGS. 19-21 illustrate a flowcharts of example sequences of acts in accordance with one or more embodiments.

Figure 19:
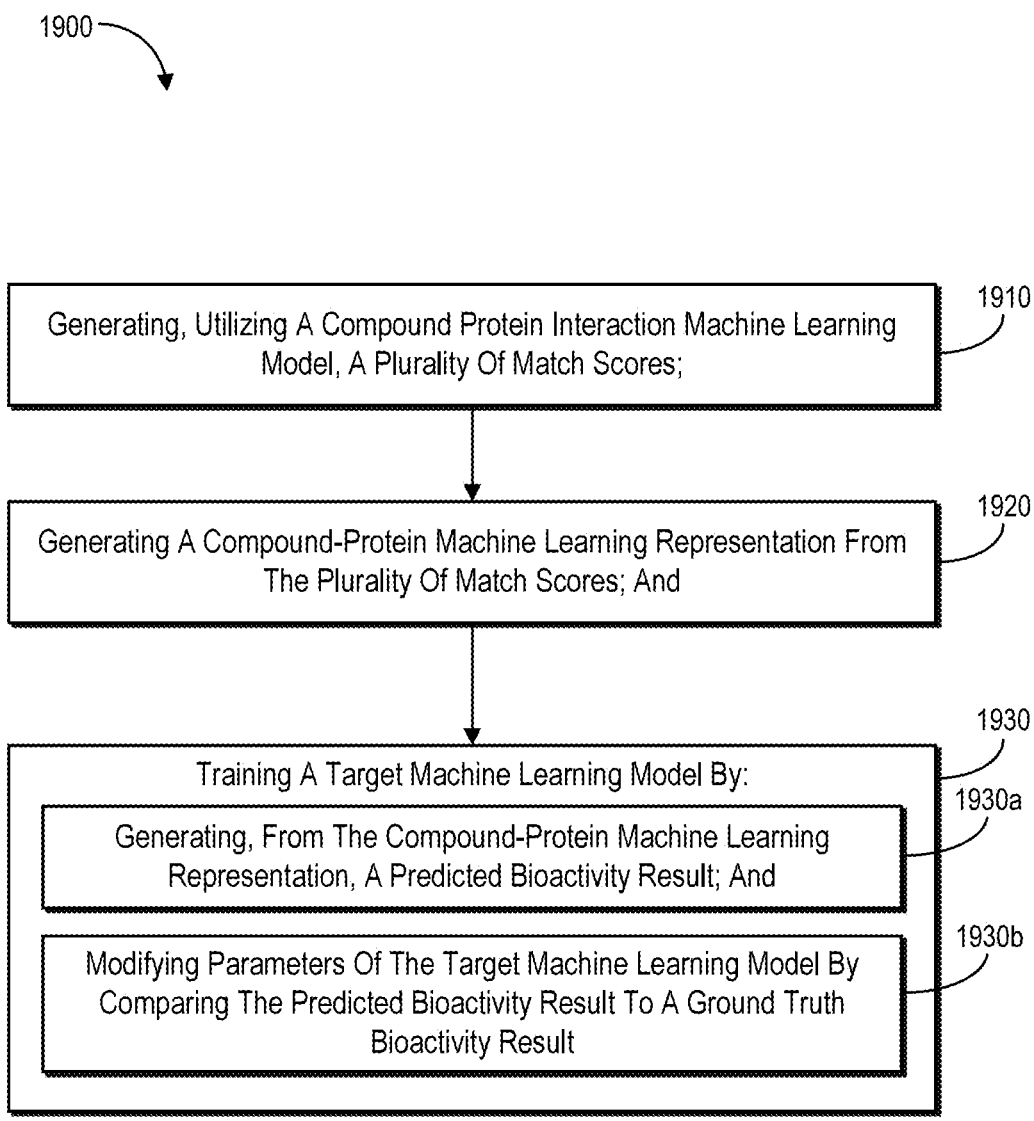
FIG. 19 illustrates an example series of acts for training a target machine learning model utilizing a compound-protein machine learning representation in accordance with one or more embodiments.
Figure 20:
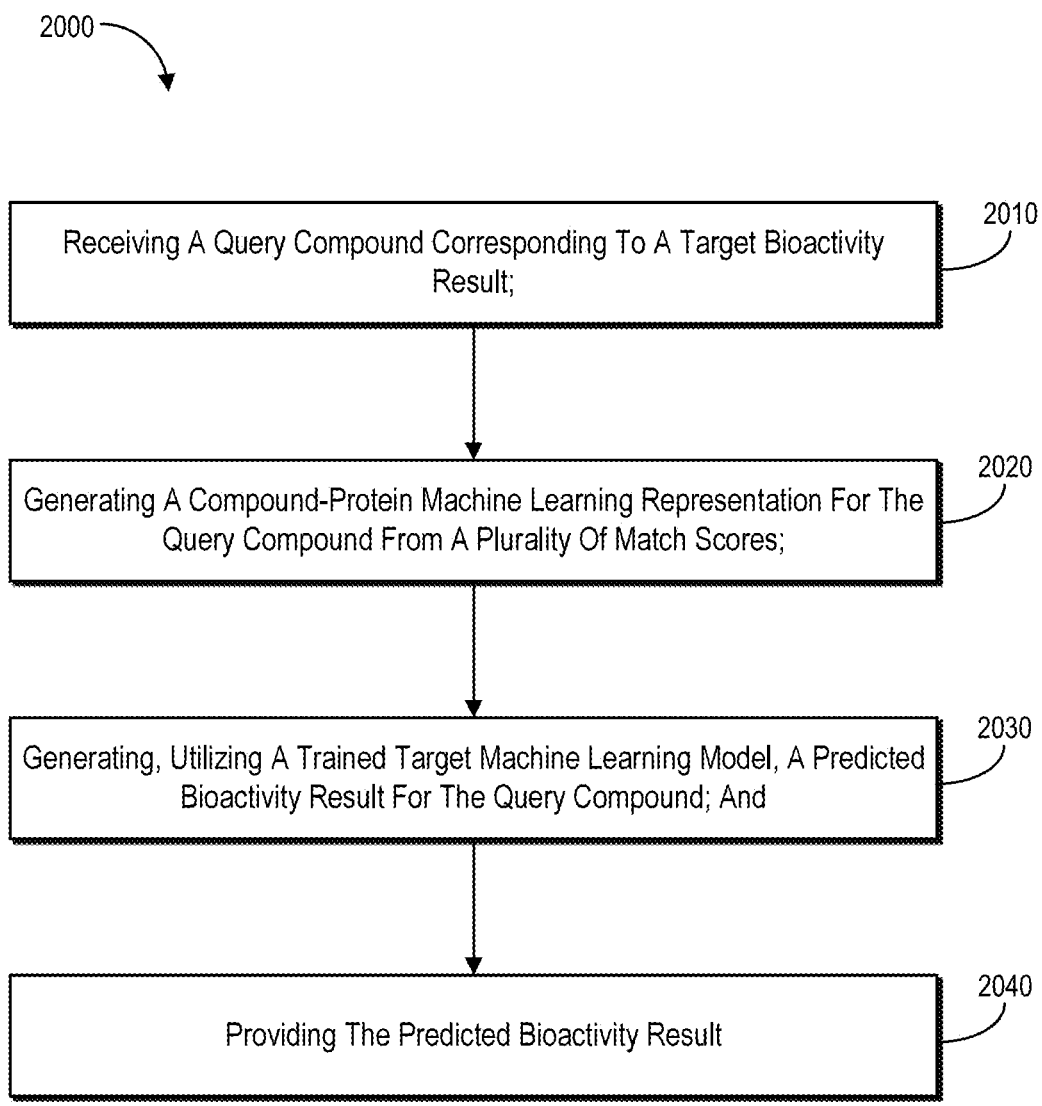
FIG. 20 illustrates an example series of acts for generating a predicted target result utilizing a trained target machine learning model from a compound-protein machine learning representation in accordance with one or more embodiments.
Figure 21:
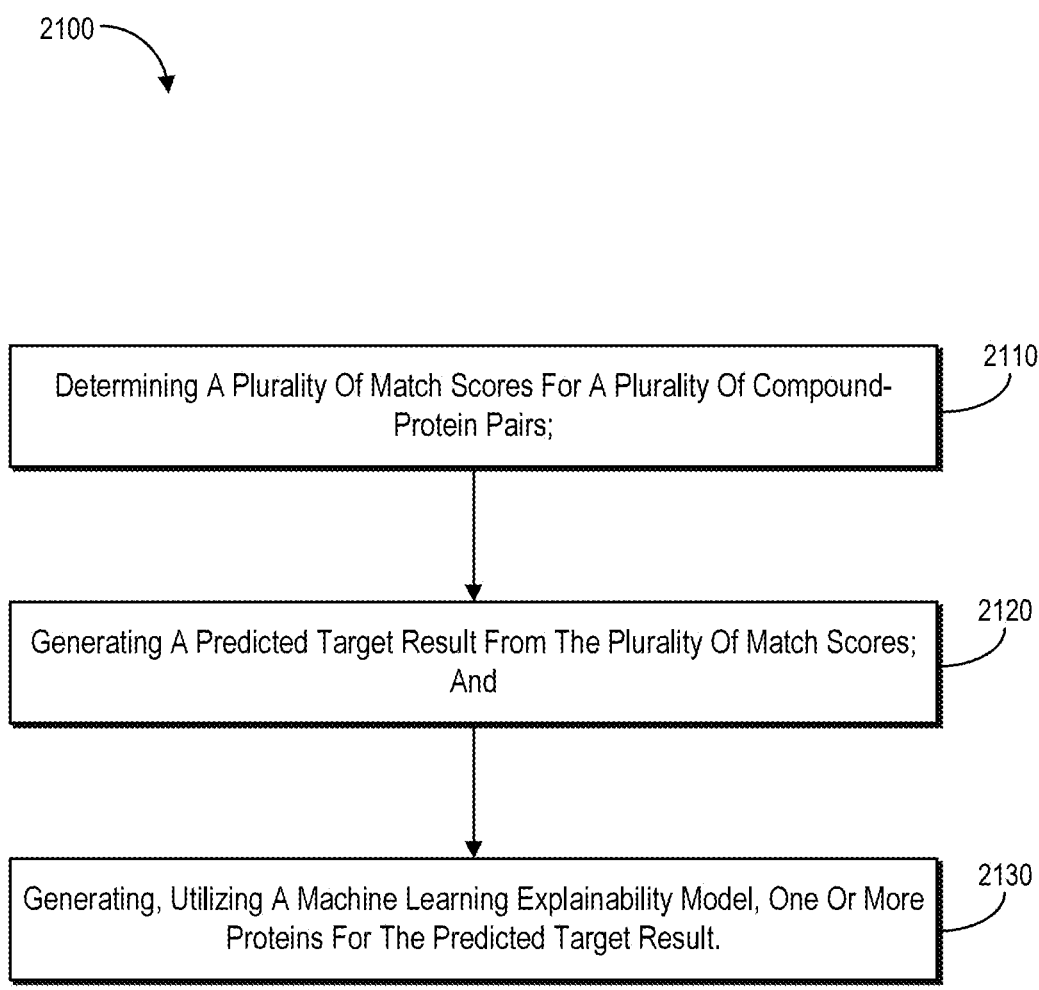
FIG. 21 illustrates an example series of acts for generating one or more contributing proteins utilizing a machine learning explainability model from a predicted target result generated from target machine learning model in accordance with one or more embodiments.

While FIGS. 19-21 illustrate acts according to some embodiments, alternative embodiments may omit, add to, reorder, and/or modify any of the acts shown in FIGS. 19-21. The acts of FIGS. 19-21 can be performed as part of a method (e.g., a computer-implemented method). Alternatively, a non-transitory computer readable medium can comprise instructions, that when executed by one or more processors (e.g., at least one processor), cause a computing device to perform the acts of FIGS. 19-21. In still further embodiments, a system can perform the acts of FIGS. 19-21. Additionally, the acts described herein may be repeated or performed in parallel with one another or in parallel with different instances of the same or other similar acts.

FIG. 19 illustrates an example series of acts 1900 for training a target machine learning model utilizing a compound-protein machine learning representation in accordance with one or more embodiments. The series of acts 1900 can include acts 1910-1930 (including acts 1930a and 1930b) of generating, utilizing a compound-protein interaction machine learning model, a plurality of match scores; generating a compound-protein machine learning representation from the plurality of match scores; and training a target machine learning model by: generating, from the compound-protein machine learning representation, a predicted bioactivity result; and modifying parameters of the target machine learning model by comparing the predicted bioactivity result to a ground truth bioactivity result.

For example, in one or more embodiments, the acts 1910-1930 include generating, utilizing a compound-protein interaction machine learning model, a plurality of match scores for a plurality of compound-protein pairs; generating a compound-protein machine learning representation from the plurality of match scores for the plurality of compound-protein pairs; and training a target machine learning model by: generating, from the compound-protein machine learning representation utilizing the target machine learning model, a predicted bioactivity result for a compound; and modifying parameters of the target machine learning model by comparing the predicted bioactivity result to a ground truth bioactivity result corresponding to the compound.

In one or more implementations, the series of acts 1900 includes generating the plurality of match scores by: generating, utilizing the compound-protein interaction machine learning model, a first match score indicating a first binding likelihood for a first compound and a first protein; and generating, utilizing the compound-protein interaction machine learning model, a second match score indicating a second binding likelihood for the first compound and a second protein.

Moreover, in one or more implementations, the series of acts 1900 includes generating the compound-protein machine learning representation from the plurality of match scores for the plurality of compound-protein pairs by: determining machine learning protein confidence scores indicating a measure of confidence of the compound-protein interaction machine learning model in generating predictions for proteins of the plurality of compound-protein pairs; and filtering one or more features based on the machine learning protein confidence scores to generate the compound-protein machine learning representation.

Further, in one or more implementations, the series of acts 1900 includes generating the compound-protein machine learning representation from the plurality of match scores for the plurality of compound-protein pairs by: identifying a training compound; and generating the compound-protein machine learning representation from a plurality of match scores for a set of compound-protein pairs corresponding to the training compound.

In addition, in one or more implementations, the series of acts 1900 includes, wherein the predicted bioactivity result comprises an ADMET prediction and training the target machine learning model comprises training the target machine learning model to generate ADMET predictions by: generating, from the compound-protein machine learning representation utilizing the target machine learning model, the ADMET prediction for the training compound; and modifying the parameters of the target machine learning model by comparing the ADMET prediction to a measured ADMET result for the training compound.

In one or more implementations, the series of acts 1900 includes, wherein the predicted bioactivity result comprises a biological perturbation program prediction and training the target machine learning model comprises training the target machine learning model to generate biological perturbation program predictions utilizing a training dataset by, for a biological perturbation program corresponding to identifying compounds demonstrating a target biological activity: generating, from the compound-protein machine learning representation utilizing the target machine learning model, the biological perturbation program prediction for the training compound; and modifying the parameters of the target machine learning model by comparing the biological perturbation program prediction with a ground truth perturbation program result.

In one or more implementations, the series of acts 1900 includes generating the training dataset by: generating measures of similarity between a target gene of the biological perturbation program and datapoints of the training dataset, wherein the measures of similarity are based on at least one of phenomic data, transcriptomic data, metabolomic data, or proteomic data; and generating the training dataset by filtering datapoints based on the measures of similarity between the datapoints and the target gene.

Moreover, in one or more implementations, the series of acts 1900 includes generating the training dataset by: identifying phenomic digital images of cell perturbations; generating, utilizing a machine learning model, phenomic image embeddings from the phenomic digital images; and generating the training dataset by filtering datapoints based on a measure of similarity of the phenomic image embeddings relative to the target gene.

Further, in one or more implementations, the series of acts 1900 includes generating the training dataset by: generating, utilizing a clustering model, clusters from a dataset utilizing chemical fingerprints of compounds; and splitting the dataset into the training dataset and a testing data set based on the clusters.

FIG. 20 illustrates an example series of acts 2000 for generating a predicted target result utilizing a trained target machine learning model from a compound-protein machine learning representation in accordance with one or more embodiments. The series of acts 2000 can include acts 2010-2040 of receiving a query compound corresponding to a target bioactivity result; generating a compound-protein machine learning representation for the query compound from a plurality of match scores; generating, utilizing a trained target machine learning model, a predicted bioactivity result for the query compound; and providing the predicted bioactivity result.

For example, in one or more embodiments, the acts 2010-2040 include receiving, from a client device, a query compound corresponding to a target result; generating a compound-protein machine learning representation for the query compound from a plurality of match scores for a plurality of compound-protein pairs corresponding to the query compound; generating, from the compound-protein machine learning representation utilizing a trained target machine learning model, a predicted target result for the query compound; and providing, to the client device, the predicted target result.

In one or more implementations, the series of acts 2000 includes receiving the query compound corresponding to the target result by receiving the query compound and an ADMET target; and generating, from the compound-protein machine learning representation utilizing a trained target machine learning model, an ADMET prediction for the query compound.

Moreover, in one or more implementations, the series of acts 2000 includes receiving the query compound corresponding to the target result by receiving a plurality of query compounds and a target biological perturbation program corresponding to a target gene; and generating, from the compound-protein machine learning representation utilizing the trained target machine learning model, impact predictions for the plurality of query compounds relative to the target gene.

Further, in one or more implementations, the series of acts 2000 includes generating, utilizing a compound-protein interaction machine learning model, the plurality of match scores for the plurality of compound-protein pairs.

In addition, in one or more implementations, the series of acts 2000 includes generating the compound-protein machine learning representation for the query compound by: determining a first match score indicating a first binding likelihood for the query compound and a first protein; and determining a second match score indicating a second binding likelihood for the query compound and a second protein.

In one or more implementations, the series of acts 2000 includes generating, utilizing a machine learning explainability model, one or more proteins contributing to the predicted target result based on the compound-protein machine learning representation.

Moreover, in one or more implementations, the series of acts 2000 includes providing, to the client device, the predicted target result by providing the one or more proteins contributing to the predicted target result.

In one or more implementations, the series of acts 2000 includes providing the one or more proteins contributing to the predicted target result by providing, for display, a heatmap indicating contribution values for a plurality of query compounds and a plurality of proteins.

FIG. 21 illustrates an example series of acts 2100 for generating one or more proteins utilizing a machine learning explainability model from a predicted target result generated from target machine learning model in accordance with one or more embodiments. The series of acts 2100 can include acts 2110-2130 of determining a plurality of match scores for a plurality of compound-protein pairs; generating a predicted target result from the plurality of match scores; and generating, utilizing a machine learning explainability model, one or more proteins for the predicted target result.

For example, in one or more embodiments, the acts 2110-2130 include determining a plurality of match scores for a plurality of compound-protein pairs; generating, utilizing a trained target machine learning model, a predicted target result from the plurality of match scores; and generating, utilizing a machine learning explainability model, one or more proteins contributing to the predicted target result.

In one or more implementations, the series of acts 2100 includes determining the plurality of match scores for the plurality of compound-protein pairs by: determining a first match score, wherein the first match score indicates a first binding likelihood for a first compound and a first protein; and determining a second match score, wherein the second match score indicates a second binding likelihood for the first compound and a second protein.

Moreover, in one or more implementations, the series of acts 2100 includes determining the plurality of match scores for the plurality of compound-protein pairs by: determining a third match score, wherein the third match score indicates a third binding likelihood for a second compound and the first protein; and determining a fourth match score, wherein the fourth match score indicates a fourth binding likelihood for the second compound and the second protein.

Further, in one or more implementations, the series of acts 2100 includes generating, utilizing the trained target machine learning model, the predicted target result from the plurality of match scores by: generating a first target result for the first compound utilizing the first match score and the second match score; and generating a second target result for the second compound utilizing the third match score and the fourth match score.

In addition, in one or more implementations, the series of acts 2100 includes generating, utilizing the machine learning explainability model, the one or more proteins contributing to the predicted target result by perturbing at least one of the first match score or the third match score to determine a first marginal contribution of the first protein in generating at least one of the first target result for the first compound or the second target result for the second compound.

In one or more implementations, the series of acts 2100 includes generating, utilizing the machine learning explainability model, the one or more proteins contributing to the predicted target result by perturbing at least one of the second match score or the fourth match score to determine a second marginal contribution of the second protein in generating at least one of the first target result for the first compound or the second target result for the second compound.

Moreover, in one or more implementations, the series of acts 2100 includes providing, for display to a client device, the first marginal contribution of the first protein and the second marginal contribution of the second protein.

Further, in one or more implementations, the series of acts 2100 includes providing the first marginal contribution of the first protein and the second marginal contribution of the second protein for display by providing, for display, an explainability heatmap illustrating the first marginal contribution in a first heatmap field corresponding to the first protein and the first compound and further illustrating the second marginal contribution in a second heatmap field corresponding to the second protein and the second compound.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 22:
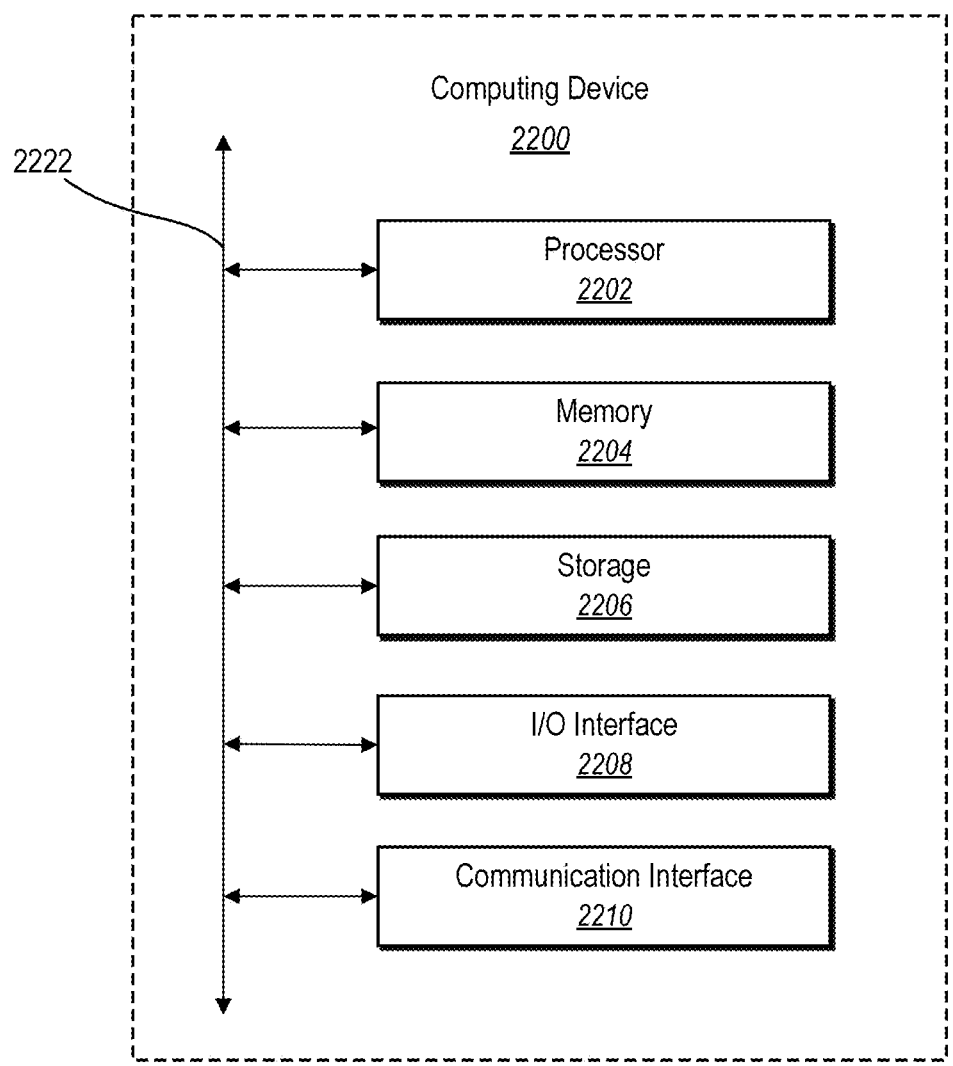
FIG. 22 illustrates a block diagram of a computing device for implementing one or more embodiments.

FIG. 22 illustrates a block diagram of an example computing device 2200 that may be configured to perform one or more of the processes described above. One will appreciate that one or more computing devices, such as the computing device 2200 may represent the computing devices described above. In one or more embodiments, the computing device 2200 may be a mobile device (e.g., a mobile telephone, a smartphone, a PDA, a tablet, a laptop, a camera, a tracker, a watch, a wearable device, etc.). In some embodiments, the computing device 2200 may be a non-mobile device (e.g., a desktop computer or another type of client device). Further, the computing device 2200 may be a server device that includes cloud-based processing and storage capabilities.

As shown in FIG. 22, the computing device 2200 can include one or more processor(s) 2202, memory 2204, a storage device 2206, input/output interfaces 2208 (or "I/O interfaces 2208"), and a communication interface 2210, which may be communicatively coupled by way of a communication infrastructure (e.g., bus 2212). While the computing device 2200 is shown in FIG. 22, the components illustrated in FIG. 22 are not intended to be limiting. Additional or alternative components may be used in other embodiments. Furthermore, in certain embodiments, the computing device 2200 includes fewer components than those shown in FIG. 22. Components of the computing device 2200 shown in FIG. 22 will now be described in additional detail.

In particular embodiments, the processor(s) 2202 includes hardware for executing instructions, such as those making up a computer program. As an example, and not by way of limitation, to execute instructions, the processor(s) 2202 may retrieve (or fetch) the instructions from an internal register, an internal cache, memory 2204, or a storage device 2206 and decode and execute them.

The computing device 2200 includes memory 2204, which is coupled to the processor(s) 2202. The memory 2204 may be used for storing data, metadata, and programs for execution by the processor(s). The memory 2204 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 2204 may be internal or distributed memory.

The computing device 2200 includes a storage device 2206 includes storage for storing data or instructions. As an example, and not by way of limitation, the storage device 2206 can include a non-transitory storage medium described above. The storage device 2206 may include a hard disk drive (HDD), flash memory, a Universal Serial Bus (USB) drive or a combination these or other storage devices.

As shown, the computing device 2200 includes one or more I/O interfaces 2208, which are provided to allow a user to provide input to (such as user strokes), receive output from, and otherwise transfer data to and from the computing device 2200. These I/O interfaces 2208 may include a mouse, keypad or a keyboard, a touch screen, camera, optical scanner, network interface, modem, other known I/O devices or a combination of such I/O interfaces 2208. The touch screen may be activated with a stylus or a finger.

The I/O interfaces 2208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 2208 are configured to provide graphical data to a display for presentation to a user. The graphical data may be representative of one or more graphical user interfaces and/or any other graphical content as may serve a particular implementation.

The computing device 2200 can further include a communication interface 2210. The communication interface 2210 can include hardware, software, or both. The communication interface 2210 provides one or more interfaces for communication (such as, for example, packet-based communication) between the computing device and one or more other computing devices or one or more networks. As an example, and not by way of limitation, communication interface 2210 may include a network interface controller (NIC) or network adapter for communicating with an Ethernet or other wire-based network or a wireless NIC (WNIC) or wireless adapter for communicating with a wireless network, such as a WI-FI. The computing device 2200 can further include a bus 2212. The bus 2212 can include hardware, software, or both that connects components of computing device 2200 to each other.

In one or more implementations, various computing devices can communicate over a computer network. This disclosure contemplates any suitable network. As an example, and not by way of limitation, one or more portions of a network may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these.

In particular embodiments, the computing device 2200 can include a client device that includes a requester application or a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at the client device may enter a Uniform Resource Locator ("URL") or other address directing the web browser to a particular server (such as server), and the web browser may generate a Hyper Text Transfer Protocol ("HTTP") request and communicate the HTTP request to server. The server may accept the HTTP request and communicate to the client device one or more Hyper Text Markup Language ("HTML") files responsive to the HTTP request. The client device may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, the tech-bio exploration system 104 may include a variety of servers, sub-systems, programs, modules, logs, and data stores. In particular embodiments, the tech-bio exploration system 104 may include one or more of the following: a web server, action logger, API-request server, transaction engine, cross-institution network interface manager, notification controller, action log, third-party-content-object-exposure log, inference module, authorization/privacy server, search module, user-interface module, user-profile (e.g., provider profile or requester profile) store, connection store, third-party content store, or location store. The tech-bio exploration system 104 may also include suitable components such as network interfaces, security mechanisms, load balancers, failover servers, management-and-network-operations consoles, other suitable components, or any suitable combination thereof. In particular embodiments, the tech-bio exploration system 104 may include one or more user-profile stores for storing user profiles and/or account information for credit accounts, secured accounts, secondary accounts, and other affiliated financial networking system accounts. A user profile may include, for example, biographic information, demographic information, financial information, behavioral information, social information, or other types of descriptive information, such as interests, affinities, or location.

The web server may include a mail server or other messaging functionality for receiving and routing messages between the tech-bio exploration system 104 and one or more client devices. An action logger may be used to receive communications from a web server about a user's actions on or off the tech-bio exploration system 104. In conjunction with the action log, a third-party-content-object log may be maintained of user exposures to third-party-content objects. A notification controller may provide information regarding content objects to a client device. Information may be pushed to a client device as notifications, or information may be pulled from a client device responsive to a request received from the client device. Authorization servers may be used to enforce one or more privacy settings of the users of the tech-bio exploration system 104. A privacy setting of a user determines how particular information associated with a user can be shared. The authorization server may allow users to opt in to or opt out of having their actions logged by the tech-bio exploration system 104 or shared with other systems, such as, for example, by setting appropriate privacy settings. Third-party-content-object stores may be used to store content objects received from third parties. Location stores may be used for storing location information received from a client device associated with users.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
training a target machine learning model by:
generating, utilizing the target machine learning model, a training predicted bioactivity result from a compound-protein machine learning representation comprising a plurality of training match scores;
comparing the training predicted bioactivity result from the compound-protein machine learning representation with a ground truth bioactivity result to determine a measure of loss; and
modifying parameters of the target machine learning model based on the measure of loss;
generating, utilizing a trained compound-protein interaction machine learning model, a plurality of match scores for a plurality of compound-protein pairs corresponding to a query compound and a plurality of proteins by generating a match score of the plurality of match scores by stripping one or more layers from the trained compound-protein interaction machine learning model, wherein the plurality of match scores comprise binding probabilities between the query compound and the plurality of proteins;
generating, utilizing the target machine learning model, a predicted bioactivity result for the query compound from the plurality of match scores for the plurality of compound-protein pairs; and
determining, utilizing a machine learning explainability model, one or more proteins from the plurality of compound-protein pairs contributing to the predicted bioactivity result for the query compound by modifying features comprising the plurality of match scores for the plurality of compound-protein pairs input to the target machine learning model to determine modified bioactivity results and marginal contributions of the plurality of proteins in generating the modified bioactivity results utilizing the target machine learning model.

2. The computer-implemented method of claim 1, wherein determining the plurality of match scores for the plurality of compound-protein pairs comprises:
generating, utilizing the trained compound-protein interaction machine learning model, a first match score, wherein the first match score indicates a first binding likelihood for the query compound and a first protein; and
generating, utilizing the trained compound-protein interaction machine learning model, a second match score, wherein the second match score indicates a second binding likelihood for the query compound and a second protein.

3. The computer-implemented method of claim 2, further comprising determining an additional plurality of match scores by:
generating, utilizing the trained compound-protein interaction machine learning model, a third match score, wherein the third match score indicates a third binding likelihood for a second compound and the first protein; and
generating, utilizing the trained compound-protein interaction machine learning model, a fourth match score, wherein the fourth match score indicates a fourth binding likelihood for the second compound and the second protein.

4. The computer-implemented method of claim 3, further comprising:
generating the predicted bioactivity result for the query compound utilizing the first match score and the second match score, wherein the predicted bioactivity result comprises an absorption, distribution, metabolism, excretion, or toxicity (ADMET) prediction or a perturbation program prediction; and
generating, utilizing the target machine learning model, an additional predicted bioactivity result from the additional plurality of match scores for the second compound utilizing the third match score and the fourth match score, wherein the additional predicted bioactivity result comprises an additional ADMET prediction or an additional perturbation program prediction.

5. The computer-implemented method of claim 4, wherein generating, utilizing the machine learning explainability model, the one or more proteins contributing to the predicted bioactivity result comprises modifying at least one of the first match score or the third match score to determine a first marginal contribution of the first protein in generating at least one of the predicted bioactivity result for the query compound or the additional predicted bioactivity result for the second compound.

6. The computer-implemented method of claim 5, wherein generating, utilizing the machine learning explainability model, the one or more proteins contributing to the predicted bioactivity result comprises modifying at least one of the second match score or the fourth match score to determine a second marginal contribution of the second protein in generating at least one of the predicted bioactivity result for the query compound or the additional predicted bioactivity result for the second compound.

7. The computer-implemented method of claim 6, further comprising providing, for display to a client device, the first marginal contribution of the first protein and the second marginal contribution of the second protein by providing, for display, an explainability heatmap illustrating the first marginal contribution in a first heatmap field corresponding to the first protein and the query compound and further illustrating the second marginal contribution in a second heatmap field corresponding to the second protein and the second compound.

8. The computer-implemented method of claim 7, further comprising utilizing the explainability heatmap to identify compound clusters from the first marginal contribution or the second marginal contribution.

9. A system comprising:
at least one processor; and
at least one non-transitory computer-readable storage medium storing instructions that, when executed by the at least one processor, cause the system to:
train a target machine learning model by:
generating, utilizing the target machine learning model, a training predicted bioactivity result from a compound-protein machine learning representation comprising a plurality of training match scores;
comparing the training predicted bioactivity result from the compound-protein machine learning representation with a ground truth bioactivity result to determine a measure of loss; and modifying parameters of the target machine learning model based on the measure of loss;

generate, utilizing a trained compound-protein interaction machine learning model, a plurality of match scores for a plurality of compound-protein pairs corresponding to a query compound and a plurality of proteins by generating a match score of the plurality of match scores by stripping one or more layers from the trained compound-protein interaction machine learning model, wherein the plurality of match scores comprise binding probabilities between the query compound and the plurality of proteins;

generate, utilizing the target machine learning model, a predicted bioactivity result for the query compound from the plurality of match scores for the plurality of compound-protein pairs; and determine, utilizing a machine learning explainability model, one or more proteins from the plurality of compound-protein pairs contributing to the predicted bioactivity result for the query compound by modifying features comprising the plurality of match scores for the plurality of compound-protein pairs input to the target machine learning model to determine modified bioactivity results and marginal contributions of the plurality of proteins in generating the modified bioactivity results utilizing the target machine learning model.

10. The system of claim 9, further comprising instructions that, when executed by the at least one processor, cause the system to determine the plurality of match scores for the plurality of compound-protein pairs by:

generating, utilizing the trained compound-protein interaction machine learning model, a first match score, wherein the first match score indicates a first binding likelihood for the query compound and a first protein; and generating, utilizing the trained compound-protein interaction machine learning model, a second match score, wherein the second match score indicates a second binding likelihood for the query compound and a second protein.

11. The system of claim 10, further comprising instructions that, when executed by the at least one processor, cause the system to determine an additional plurality of match scores by:

generating, utilizing the trained compound-protein interaction machine learning model, a third match score, wherein the third match score indicates a third binding likelihood for a second compound and the first protein; and generating, utilizing the trained compound-protein interaction machine learning model, a fourth match score, wherein the fourth match score indicates a fourth binding likelihood for the second compound and the second protein.

12. The system of claim 11, further comprising instructions that, when executed by the at least one processor, cause the system to:

generate the predicted bioactivity result for the query compound utilizing the first match score and the second match score, wherein the predicted bioactivity result comprises an absorption, distribution, metabolism, excretion, or toxicity (ADMET) prediction; and generating, utilizing the target machine learning model, an additional predicted bioactivity result from the additional plurality of match scores for the second compound utilizing the third match score and the fourth match score, wherein the additional predicted bioactivity result comprises an additional ADMET prediction.

13. The system of claim 12, further comprising instructions that, when executed by the at least one processor, cause the system to generate, utilizing the machine learning explainability model, the one or more proteins contributing to the predicted bioactivity result by modifying at least one of the first match score or the third match score to determine a first marginal contribution of the first protein in generating at least one of the predicted bioactivity result for the query compound or the additional predicted bioactivity result for the second compound.

14. The system of claim 13, further comprising instructions that, when executed by the at least one processor, cause the system to provide, for display to a client device, the first marginal contribution of the first protein and the predicted bioactivity result.

15. A non-transitory computer-readable medium storing instructions that, when executed by at least one processor, cause a computing device to:

train a target machine learning model by;

generating, utilizing the target machine learning model, a training predicted bioactivity result from a compound-protein machine learning representation comprising a plurality of training match scores;

comparing the training predicted bioactivity result from the compound-protein machine learning representation with a ground truth bioactivity result to determine a measure of loss; and modifying parameters of the target machine learning model based on the measure of loss; and generate, utilizing a trained compound-protein interaction machine learning model, a plurality of match scores for a plurality of compound-protein pairs corresponding to a query compound and a plurality of proteins by generating a match score of the plurality of match scores by stripping one or more layers from the trained compound-protein interaction machine learning model, wherein the plurality of match scores comprise binding probabilities between the query compound and the plurality of proteins;

generate, utilizing the target machine learning model, a predicted bioactivity result for the query compound from the plurality of match scores for the plurality of compound-protein pairs; and determine, utilizing a machine learning explainability model, one or more proteins from the plurality of compound-protein pairs contributing to the predicted bioactivity result for the query compound by modifying features comprising the plurality of match scores for the plurality of compound-protein pairs input to the target machine learning model to determine modified bioactivity results and marginal contributions of the plurality of proteins in generating the modified bioactivity results utilizing the target machine learning model.

16. The non-transitory computer-readable medium of claim 15, further comprising instructions that, when executed by the at least one processor, cause the computing device to determine the plurality of match scores for the plurality of compound-protein pairs by:

generating, utilizing the trained compound-protein interaction machine learning model, a first match score, wherein the first match score indicates a first binding likelihood for the query compound and a first protein; and generating, utilizing the trained compound-protein interaction machine learning model, a second match score, wherein the second match score indicates a second binding likelihood for the query compound and a second protein.

17. The non-transitory computer-readable medium of claim 16, further comprising instructions that, when executed by the at least one processor, cause the computing device to determine an additional plurality of match scores by:

generating, utilizing the trained compound-protein interaction machine learning model, a third match score, wherein the third match score indicates a third binding likelihood for a second compound and the first protein; and generating, utilizing the trained compound-protein interaction machine learning model, a fourth match score, wherein the fourth match score indicates a fourth binding likelihood for the second compound and the second protein.

18. The non-transitory computer-readable medium of claim 17, further comprising instructions that, when executed by the at least one processor, cause the computing device:

generate the predicted bioactivity result for the query compound utilizing the first match score and the second match score, wherein the predicted bioactivity result comprises a perturbation program prediction; and generate, utilizing the target machine learning model, an additional predicted bioactivity result from the additional plurality of match scores for the second compound utilizing the third match score and the fourth match score, wherein the additional predicted bioactivity result comprises an additional perturbation program prediction.

19. The non-transitory computer-readable medium of claim 18, further comprising instructions that, when executed by the at least one processor, cause the computing device to generate, utilizing the machine learning explainability model, the one or more proteins contributing to the predicted bioactivity result by modifying at least one of the first match score or the third match score to determine a first marginal contribution of the first protein in generating at least one of the predicted bioactivity result for the query compound or the additional predicted bioactivity result for the second compound.

20. The non-transitory computer-readable medium of claim 19, further comprising instructions that, when executed by the at least one processor, cause the computing device to provide, for display to a client device, the first marginal contribution of the first protein and the predicted bioactivity result.

\* \* \* \* \*